(12) United States Patent
Betts

(10) Patent No.: US 7,522,679 B2
(45) Date of Patent: Apr. 21, 2009

(54) SYSTEM AND METHOD FOR ADAPTING TO A CHANGE IN CONSTELLATION DENSITY WHILE RECEIVING A SIGNAL

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 804 days.

(21) Appl. No.: 10/956,780

(22) Filed: Oct. 1, 2004

(65) Prior Publication Data

US 2005/0074070 A1    Apr. 7, 2005

Related U.S. Application Data

(60) Provisional application No. 60/507,885, filed on Oct. 1, 2003.

(51) Int. Cl.
*H03D 1/00* (2006.01)
*H03M 13/03* (2006.01)

(52) U.S. Cl. ........................ 375/341; 714/792
(58) Field of Classification Search .............. 375/341, 375/265, 316, 295; 714/746, 792
See application file for complete search history.

(56) References Cited

U.S. PATENT DOCUMENTS

| | | | | |
|---|---|---|---|---|
| 4,945,549 A * | 7/1990 | Simon et al. | ................ | 375/280 |
| 5,394,440 A * | 2/1995 | Goldstein et al. | ........... | 375/265 |
| 5,400,322 A | 3/1995 | Hunt et al. | .................... | 370/19 |
| 5,928,377 A * | 7/1999 | Doran et al. | ................ | 714/786 |
| 5,966,412 A * | 10/1999 | Ramaswamy | ................ | 375/341 |
| 5,987,637 A * | 11/1999 | Thomas | ....................... | 714/795 |
| 6,134,273 A * | 10/2000 | Wu et al. | ..................... | 375/261 |
| 6,246,694 B1 * | 6/2001 | Chen | ........................... | 370/468 |
| 6,310,909 B1 * | 10/2001 | Jones | ........................... | 375/220 |
| 2001/0001616 A1 * | 5/2001 | Rakib et al. | .................. | 375/259 |
| 2002/0114398 A1 * | 8/2002 | Lin et al. | ..................... | 375/253 |

FOREIGN PATENT DOCUMENTS

| | | | |
|---|---|---|---|
| GB | 2366495 | * | 6/2002 |
| WO | WO0221699 | * | 3/2002 |

OTHER PUBLICATIONS

"Memory efficient pipelined Viterbi decoder with look-ahead trace back" Jung-Gi Baek; Sang-HUn Yoon; Jong-Wha Chong; Electronics, Circuits and Systems, 2001. ICECS 2001. The 8th IEEE International Conference on vol. 2, Sep. 2-5, 2001 pp. 769-772 vol. 2.*

"Multicarrier Modulation for Data Transmission: An Idea Whose Time Has Come" by John A.C. Bingham, Published May 1990 in IEEE Communications Magazine.

* cited by examiner

*Primary Examiner*—Tesfaldet Bocure
*Assistant Examiner*—Sarah Hassan
(74) *Attorney, Agent, or Firm*—Thomas, Kayden, Horstemeyer & Risley LLP

(57) ABSTRACT

One embodiment comprises a transmitter precoder operating on an input signal to produce an output signal for modulation. The output signal is transmitted using a constellation with a constellation density. The transmitter precoder comprises scaler logic, precoder logic and selection logic. The scaler logic scales the input signal to maintain constant power on the input signal independent of the constellation density. The precoder logic precodes the scaled signal to produce a dither signal limited to a range of values. The range is inversely proportional to the constellation density. The selection logic is operable in two states. In the first state, the selection logic combines the scaled signal with the dither signal to produce the output signal. In the second state, the selection provides the scaled signal as the output signal.

20 Claims, 11 Drawing Sheets

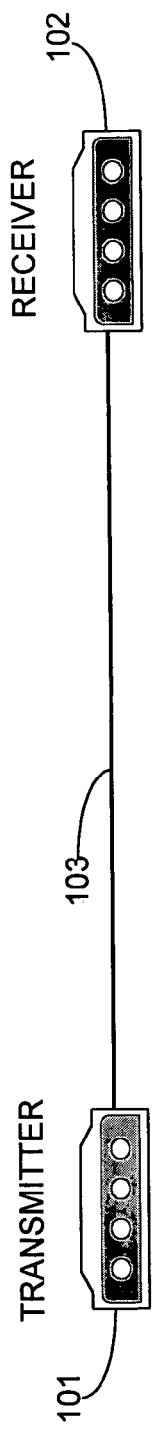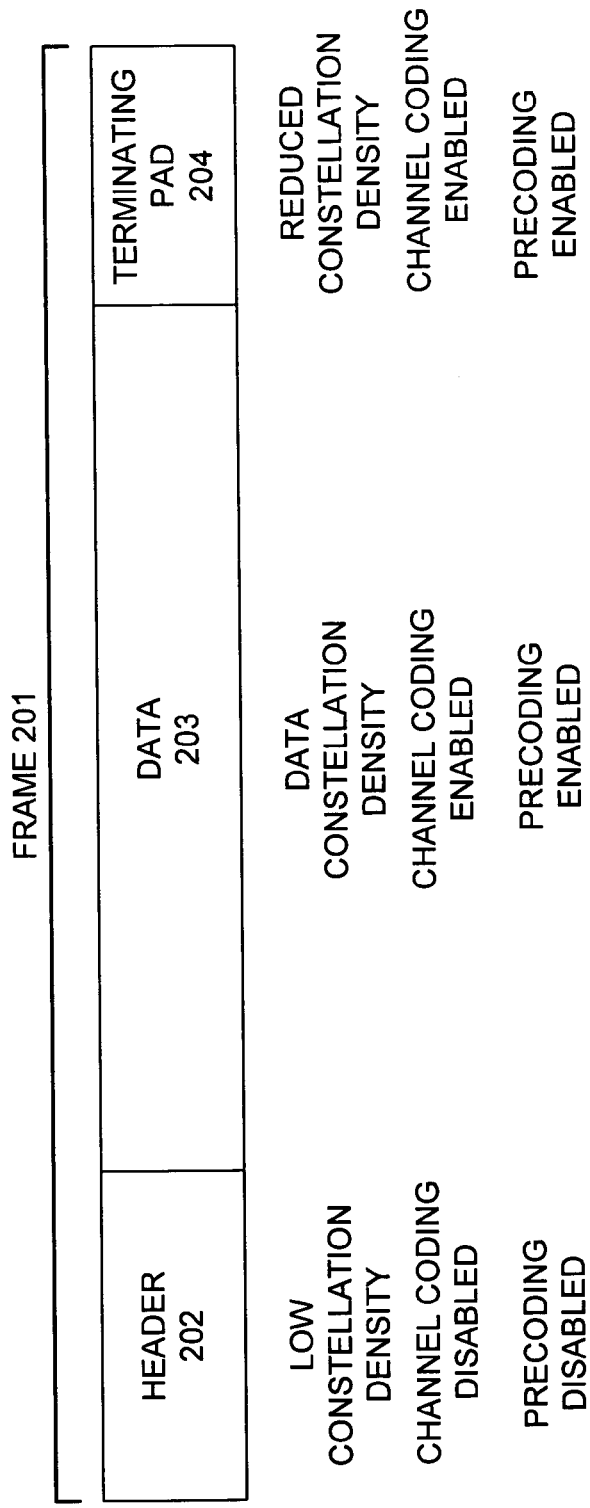

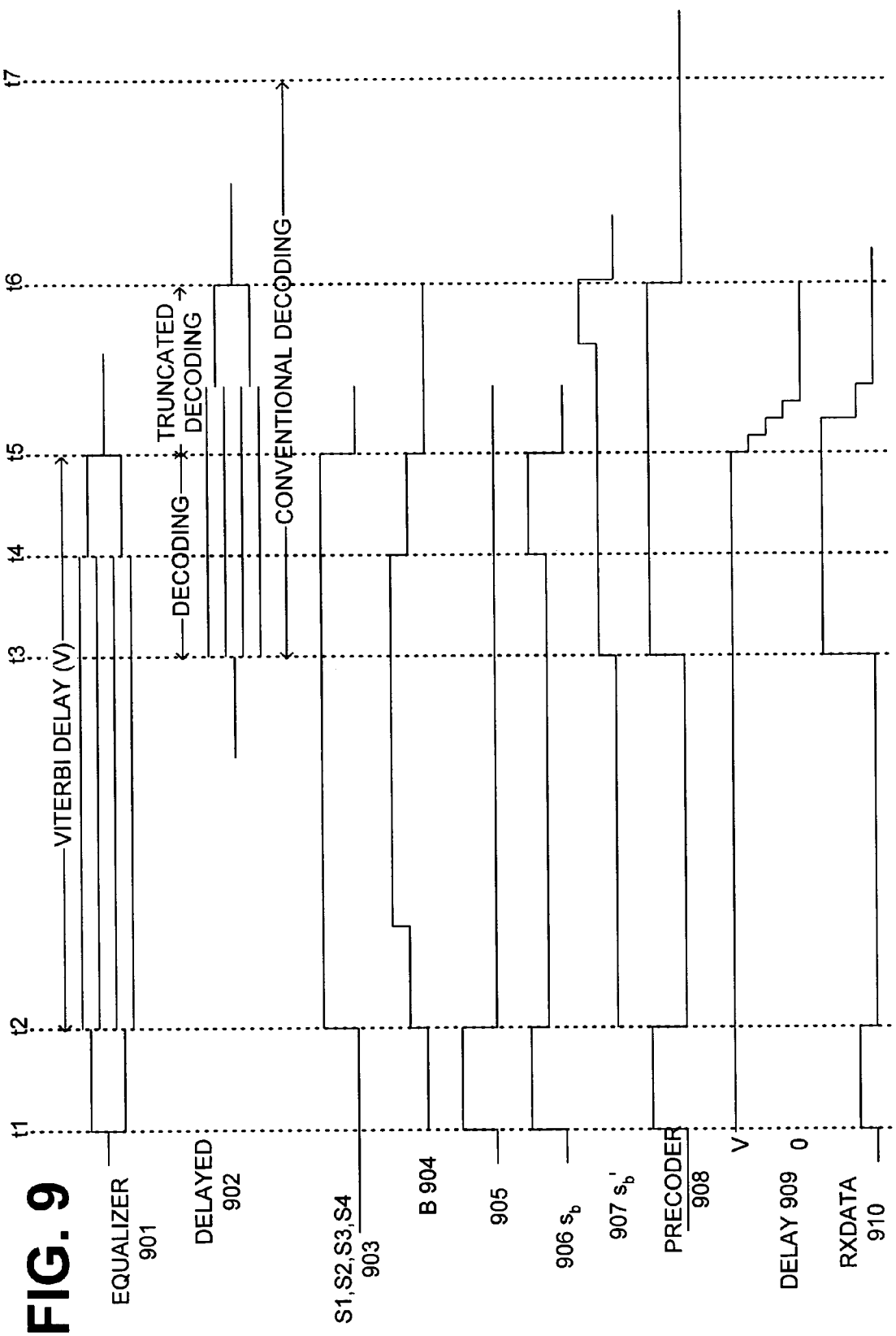

| Sample= | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Fractional Input | A1 | A2 | A3 | A4 | | A5 | | A6 | | A7 | | A8 | | A9 | | A10 | | | | |
| Fractional Input | B1 | B2 | B3 | B4 | | B5 | | B6 | | B7 | | B8 | | B9 | | B10 | | | | |
| Phase Input | E1 | E2 | E3 | E4 | | E5 | | E6 | | E7 | | E8 | | E9 | | E10 | | | | |
| Coded Input | L1 | L2 | L3 | L4 | | L5 | | L6 | | L7 | | L8 | | L9 | | L10 | | | | |
| Fractional Output | *A1* | *B1* | *A2* | *B2* | *A3* | *B3* | *A4* | *B4* | *A5* | *B5* | *A6* | *B6* | *A7* | *B7* | *A8* | *B8* | *A9* | *B9* | *A10* | *B10* |
| Rotation Output | *E1* | *E2* | *E3* | *E4* | *L1* | *E5* | *L2* | *E6* | *L3* | *E7* | *L4* | *E8* | *L5* | *E9* | *L6* | *E10* | *L7* | *L8* | *L9* | *L10* |
| Decoder Output | | | | | *A1* *E1* *A3* *L1* | | *B1* *E2* *A4* *L2* | *B4* *E6* | *A2* *E3* *A5* *L3* | | *B2* *E4* *A6* *L4* | | *B3* *E5* *A7* *L5* | | *B4* *E6* *A8* *L6* | | *B5* *E7* *A9* *L7* | *B6* *E8* *B9* *L8* | *B7* *E9* *A10* *L9* | *B8* *E10* *B10* *L10* |
| Decoder Late FIFO | | | | | *A3* *L1* | | *A4* *L2* | | *A5* *L3* | | *A6* *L4* | | *A7* *L5* | | *A8* *L6* | | *A9* *L7* | *B9* *L8* | *A10* *L9* | *B10* *L10* |
| Reconstruct and Slice | | | | | *A1* *E1* | | *B1* *E2* | | *A2* *E3* | | *B2* *E4* | *A3* *L1* | *B3* *E5* | *A4* *L2* | *B4* *E6* | *A5* *L3* | B5 A6 E7 L4 | B6 A7 E8 L5 | B7 A8 E9 L6 | B8 A9 B9 A10 B10 E10 L7 L8 L9 L10 |
| Slicer Early FIFO | | | | | *E1* | | *E2* | | *E3* | | *E4* | | *E5* | | *E6* | | *E7* | *E8* | *E9* | *E10* |
| De-Interleave and Modulus Convert | | | | | | | *A1* *B1* | | | | *A2* *B2* | | *A3* *B3* | | *A4* *B4* | | *A5* *B5* | *A5* *B5* | A6 A7 B6 B7 | A8 A9 A10 B8 B9 B10 |
| Data Output | | | | | | | | | | | | *A1* *B1* *E1* *L1* | *A2* *B2* *E2* *L2* | *A3* *B3* *E3* *L3* | | *A4* *B4* *E4* *L4* | A5 B5 E5 L5 | A6 B6 E6 L6 | A7 B7 E7 L7 | A8 A9 A10 B8 B9 B10 E8 E9 E10 L8 L9 L10 |

FIGURE 10

SYSTEM AND METHOD FOR ADAPTING TO A CHANGE IN CONSTELLATION DENSITY WHILE RECEIVING A SIGNAL

CROSS-REFERENCE TO RELATED APPLICATION

This application claims the benefit of U.S. Provisional No. 60/507,885, filed Oct. 1, 2003.

FIELD OF THE INVENTION

The present invention relates generally to data communications, and more particularly, to a system and method for adapting to a change in constellation density while receiving a signal.

BACKGROUND

A well-known technique for providing multi-point modulation over a single communications channel is Time Domain Duplexing (TDD). In TDD, a control modem transmits data downstream to one or more tributary modems, then the control modem receives transmissions upstream from any of the tributary modems on a shared channel. If the downstream and upstream channels are isolated (spatially, by frequency division, or by other means) then the downstream transmission can be continuous even though the upstream channel is shared. Each modem must terminate its transmission to allow other modems sharing the same channel to transmit. Examples of TDD systems include Multiple Virtual Line, Digital Subscriber Line (DSL) and ReachDSL®.

Block framed burst communication systems, such as DSL Discrete Multitone Modulation (DMT), also terminate transmission. These systems terminate transmission at the end of each DMT symbol period.

TDD systems typically used uncoded modulation rather than Trellis Coded Modulation (TCM) even though TCM provides 3-6 dB of performance gain, because Trellis decoding significantly increases line turn-around time (the time it takes a particular tributary modem to stop receiving and start transmitting). Trellis decoding typically requires a lengthy delay through a Viterbi decoder. During this time, the channel is out of service because the receiver must complete Viterbi decoding of a frame before transmission.

This same Viterbi decoder delay makes Trellis coding incompatible with use of a Decision Feedback Equalizer (DFE) in the receiver, since decoder delay prevents timely generation of reference vectors needed by the DFE. Therefore, in systems using TCM, intersymbol interference is typically handled with a precoder in the transmitter rather than a DFE in the receiver. However, conventional precoder designs are incompatible with systems that switch constellation densities or that switch between coded/uncoded transmissions (e.g. ReachDSL V2®). With a conventional precoder, power is scaled at the precoder output, and the power of the signal within the precoder's Finite Impulse Response (FIR) varies directly in proportion to constellation density. A change in constellation density, as would occur for a change in data transmission rate, therefore causes a power discontinuity within the precoder, which results in errors.

DESCRIPTION OF THE DRAWINGS

The accompanying drawings illustrate several aspects of the present invention, and together with the description serve to explain the principles of the invention.

FIG. 1 is a block diagram of a communications system using an exemplary embodiment.

FIG. 2 is a block diagram of a frame structure used by the communications system of FIG. 1.

FIG. 9 is a timing diagram of the receiver used by the communications system of FIG. 1.

FIG. 10 illustrates the sequence produced by one embodiment of a transmitter with rate-adaptive symbol interleaving.

DETAILED DESCRIPTION

Figure 3:
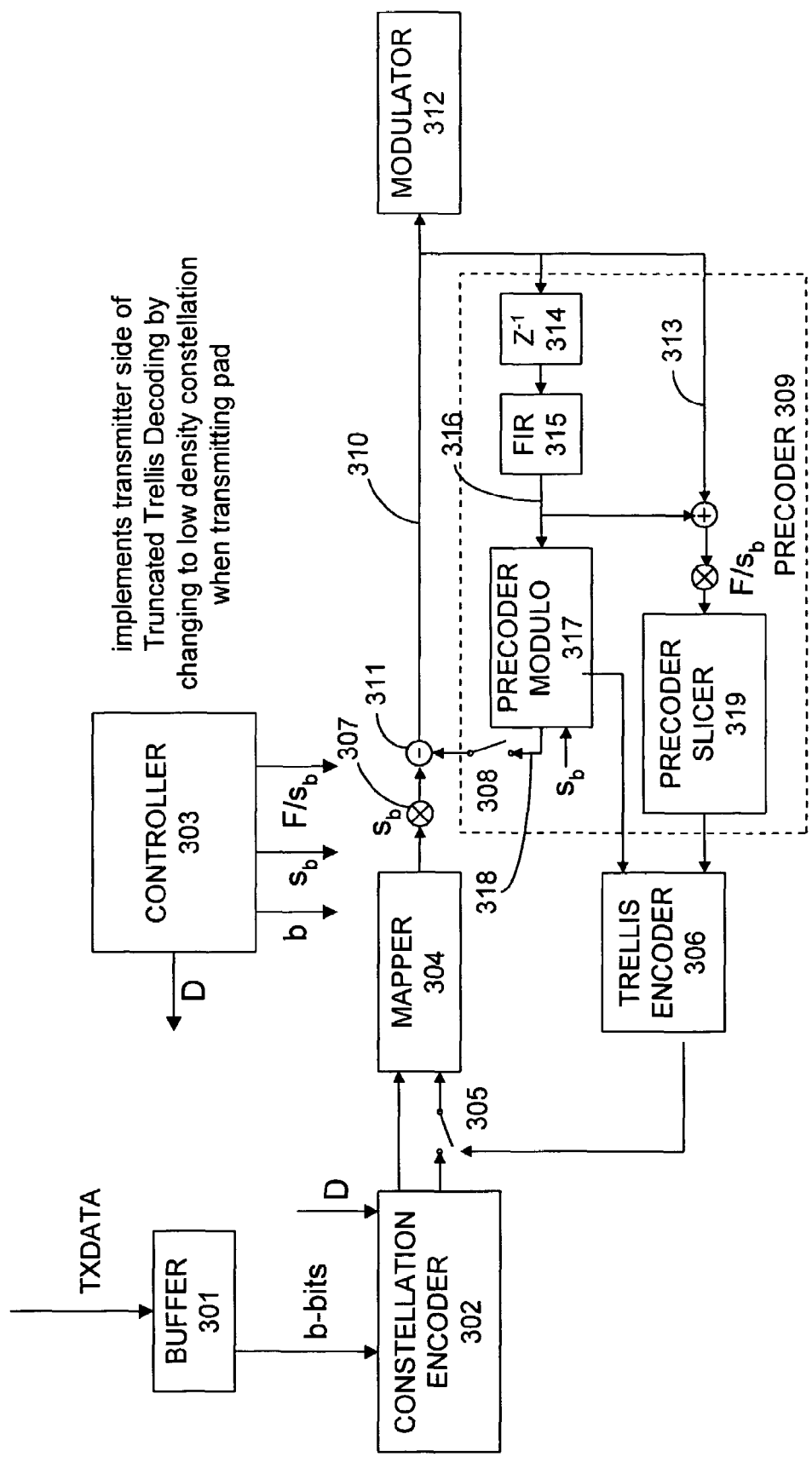
FIG. 3 is a block diagram of the transmitter used by the communications system of FIG. 1.

One embodiment uses truncated Trellis decoding that reduces delay through the Viterbi decoder. A standard Trellis coding/decoding system transmits data with a constellation density of L, where L is a function of the channel signal-to-noise ratio (SNR) and data transmission rate. With Truncated Trellis coding/decoding, the transmitter appends a terminating pad to the end of each frame, and the pad is transmitted with a reduced constellation density. The pad could contain user data, cyclic redundancy check (CRC) symbols, etc., or it could be discarded.

In this embodiment, this reduced constellation density may be used such that in the receiver the Trellis path metrics of the best path are improved by more than the gain of the Viterbi decoder. Viterbi decoding of symbols received before the pad can then be truncated since the increased margin makes the pad symbols and their associated path metrics very reliable.

Another embodiment employs a rate-adaptive precoder that seamlessly adapts to changing constellation densities and coding modes. In this embodiment, input to the precoder may be scaled to maintain a constant power level within the precoder, independent of constellation density. A power discontinuity within the precoder FIR is thus avoided when the constellation density changes. Although the precoder is not active during uncoded transmissions (e.g., frame headers), the precoder's FIR is filled with reference vectors for the header. Accordingly, intersymbol interference (ISI) from the uncoded header is accommodated by the precoder.

Yet another embodiment employs a rate-adaptive symbol interleaver for multi-dimensional Trellis codes. When symbol interleaving is used, the early symbol component and the late symbol component of a particular multi-dimensional Trellis symbol are not transmitted consecutively, but are interleaved with symbol components from other multi-dimensional Trellis symbols. In yet another embodiment, constellation-encoded portions of a particular Trellis symbol component are transmitted sequentially and are not aligned with their corresponding multi-dimensional Trellis symbol. At the receiver, the equalizer output is scaled to a uniform grid for slicing and decoding. The uniform grid ensures consistent error metric calculations, because error vectors are compressed on constellations with lower densities. The constellation density and corresponding scale factor can change on any fractional frame boundary if the embodiment uses fractional encoding. These embodiments may be used alone or in various combinations for optimal performance. A non-limiting list of combinations includes: truncated Trellis decoding; truncated Trellis decoding and rate-adaptive precoding; truncated Trellis decoding and rate-adaptive Trellis symbol interleaving; rate-adaptive precoding and rate-adaptive Trellis symbol interleaving.

FIG. 1 is a block diagram of a communications system incorporating an exemplary embodiment. Communications devices 101 and 102 communicate over channel 103. Channel 103 can use a wired medium (e.g., twisted pair, coax, hybrid-fiber coax, or other suitable wire-based medium), or can be wireless (e.g., wireless Local Area Network, satellite, mobile phone, near field communication device, or other suitable wireless medium). In this simplified diagram, device 101 is shown as the transmitter, and device 102 is shown as the receiver, as may be the case in broadcast applications. However, it will be understood that each device contains both transmit and receive functionality, as may be the case in duplex applications. In one embodiment, channel 103 is a subscriber loop, and devices 102 and 101 are Digital Subscriber Loop (DSL) modems.

FIG. 2 is a block diagram of a Physical Media Dependent (PMD) layer frame structure used by the communications system of FIG. 1. Frame 201 consists of header 202, data 203, and terminating pad 204. Terminating pad 204 is transmitted with a lower constellation density than data 203, so that receiver 102 must adapt to this change in constellation density at the end of data 203, before terminating pad 204 is received.

The method used by receiver 102 to determine receipt of terminating pad 204 depends on details of the PMD-layer frame structure. With this exemplary embodiment, terminating pad 204 is a fixed size, so determining the last symbol of terminating pad 204 is trivial once the initial symbol of terminating pad 204 is known. Determining the receipt of the initial symbol of terminating pad 204 depends on determining the end of data 203.

In one embodiment, header 202 and data 203 are also fixed size, so end of data 203 is at a fixed symbol position relative to the start of header 202. In another embodiment, header 202 contains a frame length field, which can be used to calculate end of data 203 relative to start of header 202. In yet another embodiment, data 203 contains fixed-size cells, and each cell contains a flag field which indicates whether or not that cell is the last cell in a frame. This flag can be used to calculate end of data 203 relative to the last cell. These embodiments can be generalized as "determining an end-of-data identifier." Other details about the size and contents of header 202 and data 203 vary according to implementation.

In one embodiment, receiver 102 adapts to the receipt of terminating pad 204 in other ways as well. In this embodiment, header 202 is transmitted without channel encoding (e.g., Trellis coding) and without precoding, while data 203 and terminating pad 204 are transmitted using channel encoding and precoding. Therefore, receipt of the last symbol of terminating pad 204 triggers changes in the operation of the precoder and channel encoder of receiver 102, as will be discussed in further detail hereinafter. Other combinations of coding and precoding are possible, for example, channel encoding header 202 without precoding, etc.

FIG. 3 is a block diagram of one embodiment of the transmitter 101 of FIG. 1, employing rate-adaptive precoding and Truncated Trellis decoding. Transmit data (TXD) is collected in a buffer 301 to facilitate extraction of data at a variable data rate. A conventional constellation encoder 302 encodes a variable number of data bits per symbol b using a constellation with density D. The constellation encoder may include a fractional encoder, such as a modulus converter, to encode a fractional number of bits to a constellation size D that is not a power of 2. If truncated Trellis Decoding is used in receiver 102, the controller 303 varies constellation density D so that a smaller density is used when transmitting terminating pad 204.

The encoded symbols are then mapped to signal points in a constellation by a conventional mapper 304. In this example embodiment, the mapping is rotationally invariant to avoid phase ambiguity in the channel. However, other mappings such as Gray coding can be used in other embodiments.

Switch 305 determines whether or not Trellis encoder 306 injects redundant bits into the input data path for the mapper 304. Controller 303 opens switch 305 when header 202 is being transmitted, and closes it whenever data 203 or terminating pad 204 is being transmitted. Although switch 305 and other switches are shown in these diagrams, the switches may be a logical construct in other embodiments, and a particular implementation may or may not use physical switches.

Scaler 307 at the output of mapper 304 scales the power on the constellation signal points by factor $S_b$, which is provided by controller 303. This scale factor $S_b$ is inversely proportional to the constellation density D, and is typically half the distance between points in the constellation. Table 1 lists exemplary scale factors used by one embodiment for various combinations of constellation density D and bits-per-symbol b.

TABLE 1

| Bits/Symbol | $s_b$ | $F/s_b$ ($F = 2^{23}$) | Power | Constellation Density |
|---|---|---|---|---|
| 2 (Header) | 32760 | 256 | 2.000 | 4 |
| 1.5 | 28368 | 296 | 2.000 | 4 |
| 2 | 21448 | 391 | 4.000 | 8 |
| 2.5 | 17944 | 467 | 6.000 | 8 |
| 3 | 16736 | 501 | 7.000 | 12 |
| 3.5 | 14192 | 591 | 10.000 | 16 |
| 4 | 11952 | 702 | 14.375 | 24 |
| 4.5 | 10192 | 823 | 20.000 | 32 |
| 5 | 8544 | 982 | 28.750 | 48 |
| 5.5 | 7176 | 1169 | 41.000 | 64 |
| 6 | 6080 | 1380 | 57.391 | 92 |
| 6.5 | 5104 | 1644 | 81.750 | 128 |
| 7 | 4304 | 1949 | 115.082 | 184 |
| 7.5 | 3624 | 2315 | 162.750 | 256 |
| 8 | 3048 | 2752 | 230.634 | 364 |
| 8.5 | 2560 | 3277 | 326.188 | 512 |
| 9 | 2160 | 3884 | 460.794 | 728 |
| 9.5 | 1816 | 4619 | 650.817 | 1024 |
| 10 | 1528 | 5490 | 921.722 | 1452 |
| 10.5 | 1280 | 6554 | 1304.864 | 2048 |
| 11 | 1080 | 7767 | 1845.191 | 2900 |
| 11.5 | 904 | 9279 | 2610.819 | 4096 |

In this exemplary embodiment, all values of $S_b$ are integer multiples of 8 and the largest value of $S_b$ is a 15-bit integer. These integers improve resolution and enable the use of conventional 16-bit multipliers. Other values of $S_b$ can be used in alternative embodiments, as long as the local transmitter 101 and remote receiver 102 use the same $S_b$ values for a given combination of constellation density D and bits-per-symbol b. In Table 1, $S_b$ is the controlled value, and the other values vary appropriately. $S_b$ is controlled because it will be used by the precoder modulator, and so must be identical in the local transmitter and in the remote receiver. $S_b$ controls the relative transmit power with respect to constellation density and has been scaled to accommodate the dither signal power of the circular precoder. F/sb is a compression factor that can have reduced precision with little impact on the accuracy of final decoding.

Switch 308, operated by controller 303, determines whether precoding is applied to the signal. If switch 308 is closed, the output of precoder 309 is subtracted from the scaled mapper output to produce precoded signal x (on connection 310). If switch 308 is open, preceding is not applied and subtractor 311 has no effect. The output of subtractor 311 is passed to modulator 312, where the signal is modulated by conventional means. After modulation, other conventional means (not shown) convert the modulated signal to an analog waveform, amplify the waveform and couple it to channel 103.

In addition to being supplied to modulator 312, the output of subtractor 311 is also fed back into precoder 309. Precoded signal x (on connection 310) is supplied to precoder 309 as input 313, and, after a unit delay operation 314, to FIR filter 315. The output of FIR 315 ($x_p$) is then supplied on connection 316 to modulo operator 317. The coefficients of FIR 315 are typically derived from the remote receiver 102. Unit delay operation 314 signifies that the sampled signal being currently computed is not to change the state of FIR 315 until the next sample interval.

The precoder 309 operates as follows. The output of FIR 315 ($x_p$) on connection 316 is reduced by the modulo operator 317 to produce dither signal d (on connection 318). It is dither signal d which is selected by switch 308 for subtraction from the scaled mapper output to produce the precoded signal x (on connection 310). Input 313 is added to the FIR output $x_p$ on connection 316 then scaled by factor $F/S_b$. The product of $S_b*(F/S_b)$ is F, which in one embodiment is $2^{23}$. While specific values of F are implementation-dependent, it is advantageous for F to be a uniform power of two.

After scaling by factor $F/S_b$, the signal is sliced. The action of slicer 319 is to determine the precoder Trellis state. Because precoder 309 modifies the transmitted signal, it also modifies the Trellis state of the signal. The precoder Trellis state, along with the modulo count from modulo operator 317, are used by Trellis encoder 306 to compute its next state.

In a conventional precoder, such as the one used in ITU-T Recommendation V.34, the modulo operator operates on intervals that are a power of two. This limitation of the modulo operator simplifies interoperability within standardized products, but also results in a constellation that expands with constellation density. This expansion of the constellation increases the power of the conventionally precoded signal within FIR 315. In the conventional precoder, power is scaled at the output of the precoder, and the power of the precoded signal within the FIR varies directly in proportion to constellation density. Thus, a change in constellation density when using a conventional precoder causes a precoder power discontinuity within the FIR 315, which leads to transmission errors.

In contrast, various embodiments may employ a different modulo technique to compute dither signal d. Accordingly, the transmitter embodiment of FIG. 3 scales the mapper output by $S_b$ before providing input to precoder 309. Because $S_b$ varies according to constellation density, the precoded signal x, including the contents of the precoder FIR 315, maintains a constant power level, independent of constellation density. The modulo value used by modulo operator 317 is also the constellation-dependent scalar $S_b$. Modulo operator 317 subtracts $2S_b$ from any positive signal greater than $S_b$, until it is less than or equal to $\pm S_b$. Modulo operator 317 adds $2S_b$ to any negative signal less than $-S_b$, until it is greater than or equal to $-S_b$. The result is a dither signal d with a magnitude less than or equal to $\pm S_b$. The modulo count is a base 2 count of the number of additions or subtractions performed.

Note that uncoded header 202 fills FIR 315 even though the precoder is not active (switch 308 is open). Thus, the transmitter embodiment of FIG. 3 continuously fills the memory of transmitter precoder FIR 315, thus maintaining postcursors from uncoded header 202 in FIR 315. Similarly, the receiver embodiment of FIG. 4 maintains postcursors from the header in the filter of the receiver precoder. By maintaining postcursors from uncoded header 202, precursor symbols will be accurately replicated by FIR 315 when switch 308 closes and the first precoded symbol (in data 203) is transmitted. In this way, a discontinuity is avoided when the precoder is enabled, and switching of coding mode and constellation density is seamless.

Figure 4:
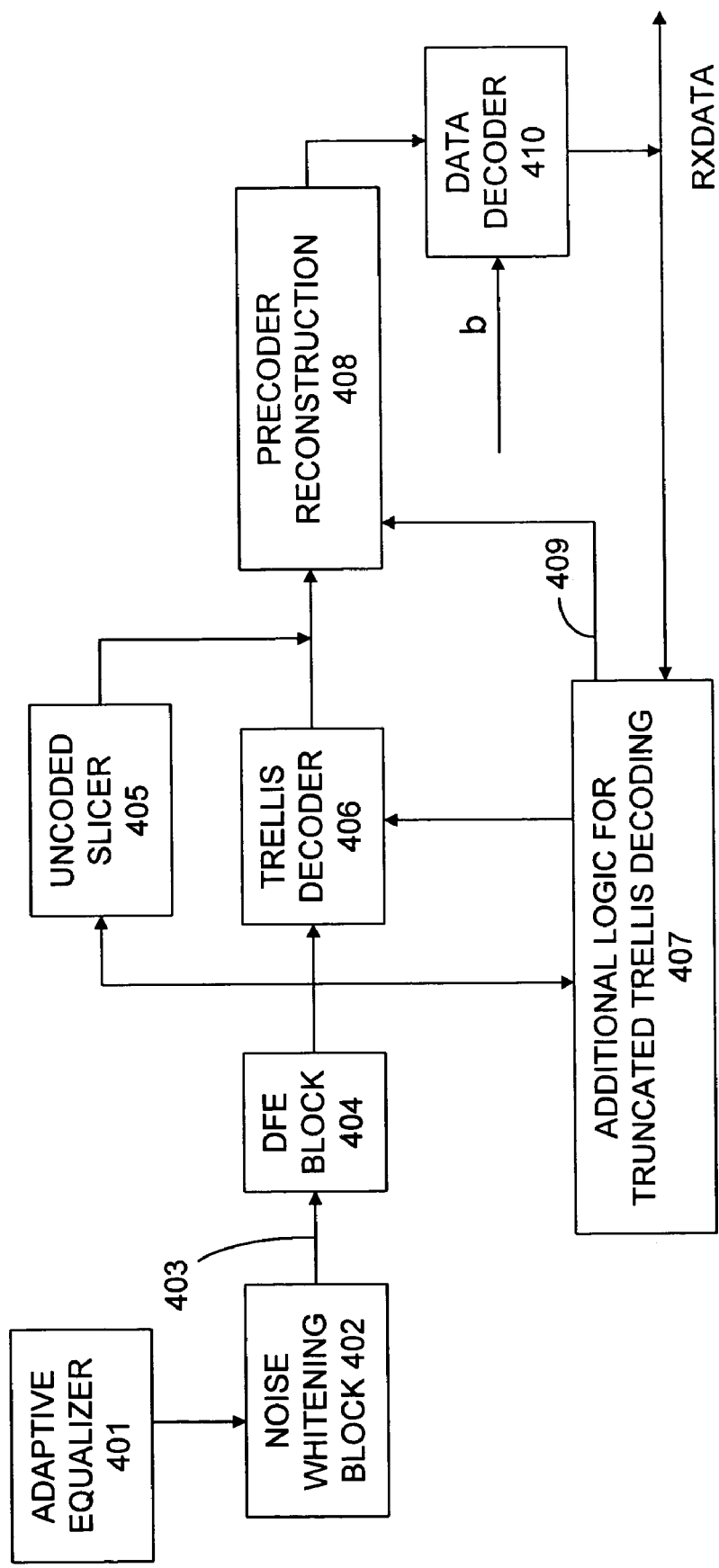
FIG. 4 is a high level block diagram of the receiver used by the communications system of FIG. 1.
Figure 5:
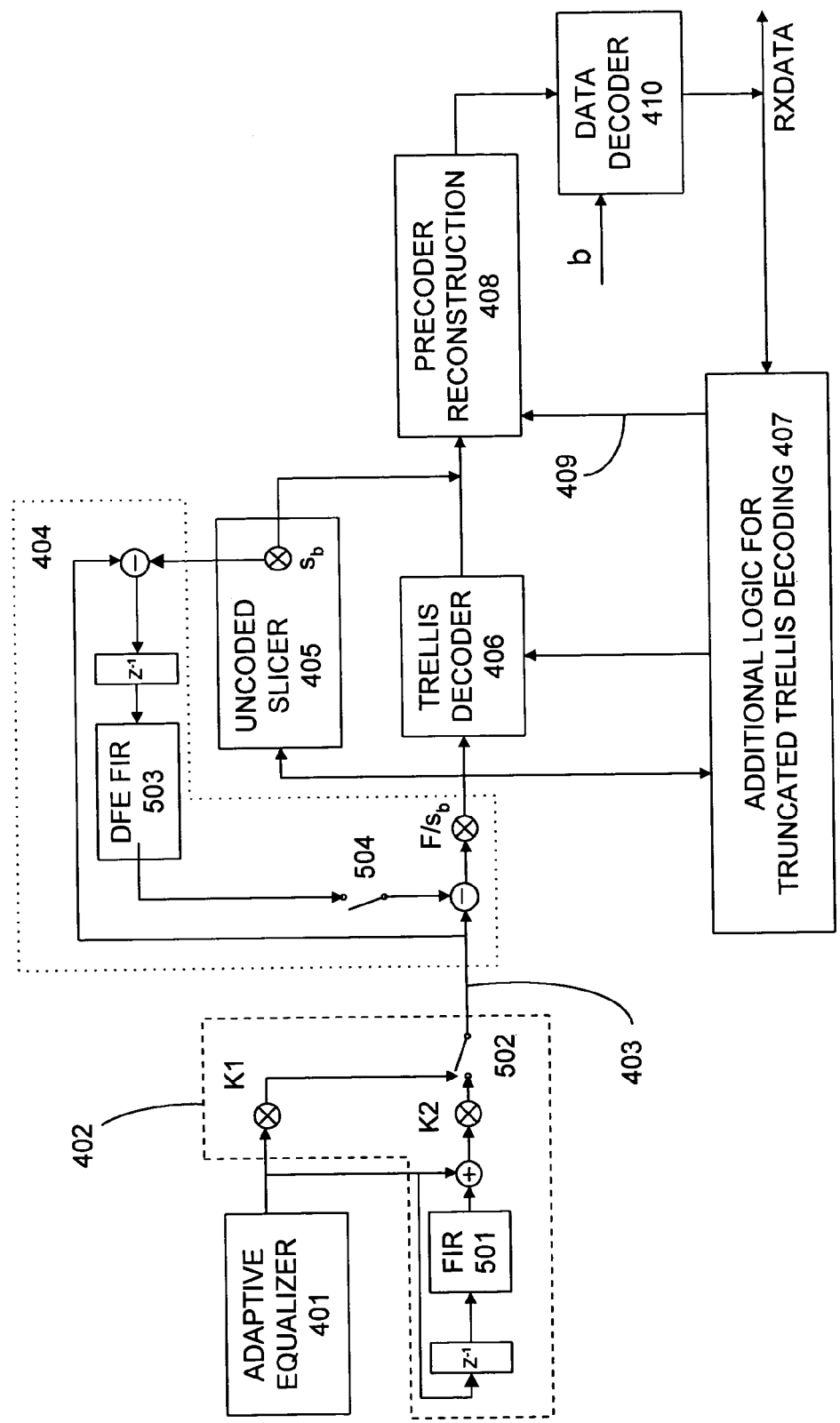
FIG. 5 is a block diagram of the receiver used by the communications system of FIG. 1 with DFE details.
Figure 6:
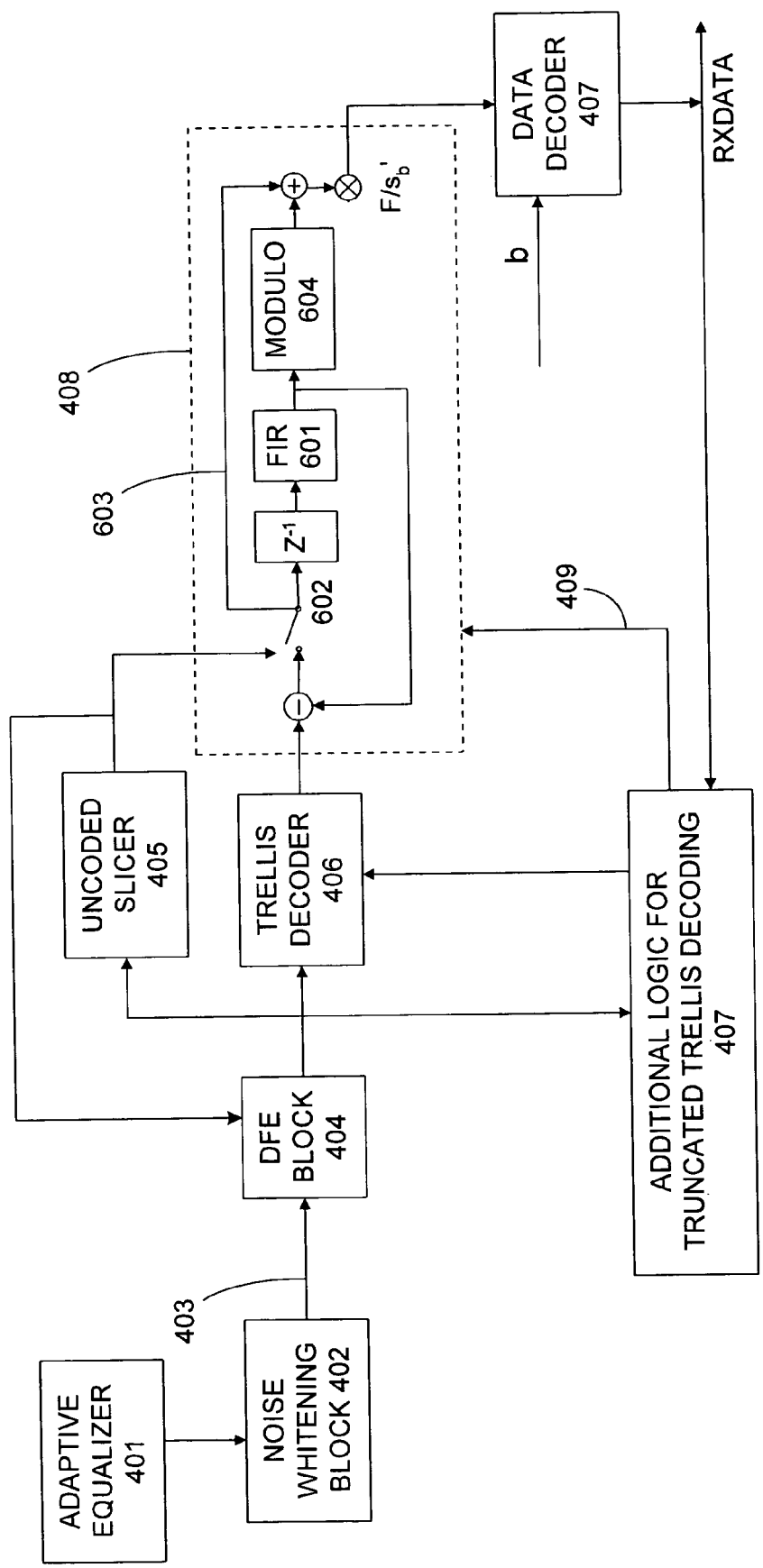
FIG. 6 is a block diagram of the receiver used by the communications system of FIG. 1 with precoder details.
Figure 7:
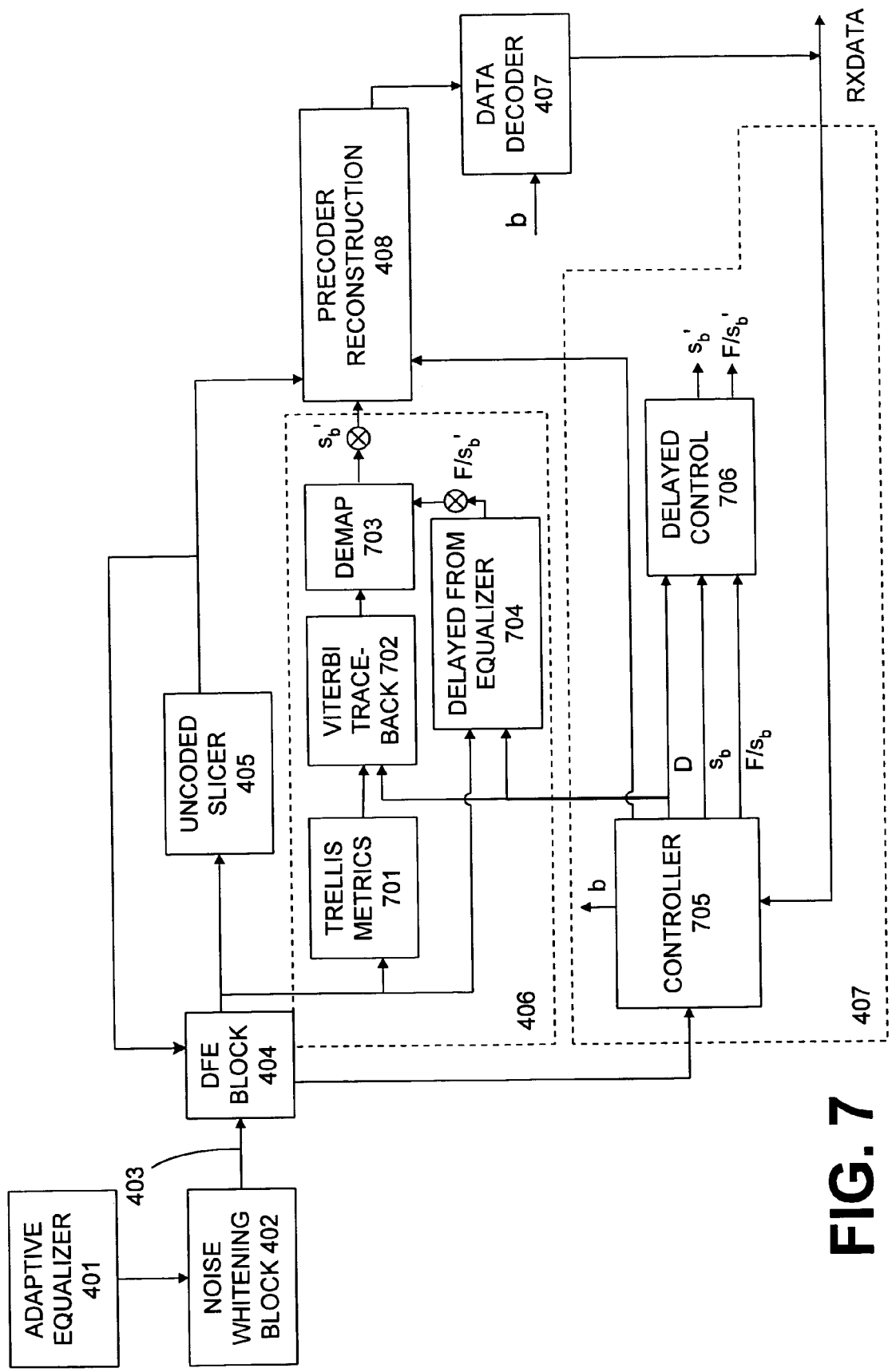
FIG. 7 is a block diagram of the receiver used by the communications system of FIG. 1 with additional details.

FIGS. 4-7 are block diagrams illustrating various embodiments of the receiver 102 of FIG. 1. FIG. 4 is a high-level block diagram, and FIGS. 5-7 illustrate various embodiments in further detail. The embodiment of FIG. 5 illustrates rate-adaptive noise-whitening and rate-adaptive decision-feedback equalization. The embodiment of FIG. 6 illustrates rate-adaptive precoding. The embodiment of FIG. 7 illustrates truncated Trellis decoding. The features of these embodiments may also combined in other ways not illustrated.

In FIG. 4, the received signal is extracted by a conventional hybrid circuit, filtered, converted from analog to digital, and digitally filtered (not shown), then supplied as input to a conventional adaptive equalizer 401. The output of adaptive equalizer 401 is supplied to noise-whitening block 402.

The noise-whitened signal on output 403 is supplied as input to a decision feedback equalizer (DFE) block 404. After equalization by DFE block 404, the equalized signal is supplied as input to uncoded slicer 405, Trellis decoder 406, and Truncated Trellis decoding logic 407. Truncated Trellis decoding logic 407 operates in conjunction with Trellis decoder 406 to perform Truncated Trellis Decoding.

The output of Trellis decoder 406 is supplied to precoder reconstruction unit 408. Precoder reconstruction unit 408 also receives input from the uncoded slicer 405 through a path which bypasses the Trellis decoder 406 (since headers are not Trellis coded), and another input (409) from Truncated Trellis decoding logic 407. Precoder reconstruction unit 408 reconstructs the symbol which was precoded by transmitter 101. After reconstruction, the constellation decoder 410 outputs received data (RXDATA) consisting of b data bits.

A. Rate-Adaptive Noise-Whitening and Decision Feedback Equalization in a Receiver FIG. 5 is a block diagram showing more details of the noise-whitening block 402 and DFE block 404. Input from adaptive equalizer 401 is fed (after a unit delay) into a noise-whitening FIR 501 with coefficients identical to those in the precoder FIR of the remote transmitter 101. The output of noise-whitening FIR 501 is then added to the output of adaptive equalizer 401. Switch 502 selects either the output of the adaptive equalizer 401 (scaled by factor K1) when operating without precoding, or selects the combined output of the noise-whitening FIR 501 and the adaptive equalizer 401 (scaled by factor K2) when operating with precoding. The scale factors K1 and K2 provide flexibility in the scale of the equalized signal. In this embodiment, a precoded signal has a larger peak signal power, which is accommodated by a smaller scale factor K2.

DFE block 404 receives as input the (scaled) reference vector output of uncoded slicer 405, which is subtracted from the noise-whitened signal on output 403. After a unit delay, this signal is provided to DFE FIR 503. The output of DFE FIR 503 is gated by switch 504 and subtracted from noise-whitened signal on output 403, then scaled by factor $F/S_b$ for input to uncoded slicer 405 and to Trellis decoder 406. The scale factor $F/S_b$ reduces the size of the constellation to a uniform grid suitable for slicing or decoding. (Values for F and $F/S_b$ were discussed above in connection with Table 1.) On a uniform grid, constellation points are all equal distance resulting in power proportional to constellation density (or data rate). Advantageously, at lower densities the slicer signal is compressed by a smaller value of factor $F/S_b$. In the process, noise or distortion on the received signal is directly compressed also, resulting in increased margin as the density is decreased.

Both the noise-whitening block 402 and DFE block 404 can operate simultaneously. The inputs are always active to fill the FIR memories in these two blocks for seamless mode transitions. In this embodiment, switch 502 and switch 504 operate in concert to activate either the noise-whitening block 402 for coded modulation or the DFE block 404 for uncoded modulation. In this embodiment, DFE block 404 implements a noise-whitening DFE, so ideal reference vectors ($x_i$) output by the uncoded slicer 405 are subtracted (after scaling by factor $S_b$ to normalize power) from the noise-whitened signal at the input to the DFE block 404. This noise-whitening operation of DFE block 404 is valuable for adapting and seamlessly updating precoder coefficients. An alternative embodiment uses an Inter-Symbol Interference (ISI) DFE instead. In that embodiment, the reference vectors are input to the DFE block 404 without being combined with the noisy equalizer signal.

B. Rate-Adaptive Precoder Reconstruction in a Receiver

FIG. 6 is a block diagram showing more details of the precoder reconstruction unit 408. Precoder reconstruction unit 408 has an enable input 409 supplied by Truncated Trellis decoding logic 407. This enable input 409 runs the precoder reconstruction unit 408 while symbols in header 202 are being received, and also while data is exiting the Viterbi traceback buffer 702. Precoder reconstruction unit 408 is not running while Viterbi traceback buffer 702 is initially filling. The precoder reconstruction unit 408 begins operation when the first Trellis-decoded symbol exits the Viterbi traceback buffer 702.

Precoder reconstruction unit 408 has two reference vector inputs: one from uncoded slicer 405 (not coded); and one from Trellis decoder 406 (originally coded by the remote transmitter). Note that internal to the Trellis decoder 406, the delayed equalizer output was scaled down for slicing then scaled back up to generate a recovered ideal reference vector. Reconstruction FIR 601 receives one of these reference vector inputs, based on the state of switch 602. In uncoded mode, switch 602 initializes reconstruction FIR 601 with reference vectors ($x_i$) from uncoded slicer 405. In coded mode, switch 602 selects the input to reconstruction FIR 601 to be the signal on output 603. This signal on output 603 is itself produced by subtracting the output of reconstruction FIR 601 from the ideal reference vector. This switching operation is an important step allowing seamless transition between Trellis precoded or uncoded modes of communication.

The output of reconstruction FIR 601 is also operated on by modulo operator 604 to produce the reconstructed dither signal (d'). The reconstructed dither signal (d') is added to the signal on output 603 to generate the final reconstructed ideal reference signal ($x_i'$). The reconstructed signal ($x_i'$) is scaled by factor ($F/S_b'$) then sliced and decoded to generate b bits of received data (RXD).

Now that both precoder reconstruction unit 408 and DFE block 404 have been discussed in detail, the interaction between them will now be described. When operating in precoded mode, switch 504 is open and the DFE block 404 is thus disabled. Conversely, when operating without precoding, switch 504 is closed and the DFE block 404 is enabled. The DFE is a powerful equalizer, which adapts in real time to changing line conditions. It avoids noise enhancement that may occur in a conventional feed forward equalizer. However, Trellis coding does not provide sufficient margin to compute reliable reference vectors ($x_i$) for immediate input to the DFE.

Therefore, the exemplary embodiments of FIGS. 3-7 utilize precoder 405 and DFE block 404 as follows. During initialization, the receiver 102 runs without precoding and without Trellis coding, utilizing the DFE instead. After initialization, the receiver 102 switches to precoded mode. The DFE block 404 is disabled and the coefficients of DFE FIR 503 are loaded into noise-whitening FIR 501 and into precoder reconstruction unit 408. The coefficients are also sent to the transmitter 101 to be loaded in the transmitter's precoder FIR.

Several methods are used by exemplary embodiments to compute the coefficients. One of the simplest embodiments uses the coefficients of a noise whitening DFE directly. With this embodiment, the DFE coefficients are initially set by a conventional equalizer training sequence. Then during normal operating mode, the DFE coefficients track changing line conditions while receiving the uncoded header. Other methods include Levinson-Durbin calculations based on the autocorrelation of the equalizer error vectors. With either embodiment, the coefficients can be sent to the transmitter 101, without disrupting data traffic, by modifying the header transmitted by the local modem to include a packet of coefficients.

C. Truncated Trellis Decoding in a Receiver

FIG. 7 is a block diagram showing more details of the Trellis decoder 406 and Truncated Trellis decoding logic 407. Trellis decoder 406 works in conjunction with Truncated Trellis decoding logic 407 to perform truncated Trellis decoding. Like any conventional Trellis decoder, the series of symbols produced by the Trellis encoder in the transmitter depends not only on the bits input to the Trellis encoder, but on the preceding symbols as well. Thus, the Trellis encoder uses state information to encode symbols, and the Trellis decoder likewise keeps track of state information when decoding symbols. A conventional Trellis decoder uses state information as input in order to output a symbol.

In the embodiment of FIG. 7, Trellis decoder 406 processes a number of symbols conventionally using new state information, and then is able, using input from Truncated Trellis decoding logic 407, to output the remaining symbols of the frame without the need for further state information. The Trellis decoding is thus "truncated" at this point, and the total delay for decoding an entire frame is reduced. Details of the truncation process will be explained with reference to FIG. 8.

In one embodiment, Trellis decoder 406 consists of Trellis metric logic 701, Viterbi traceback buffer 702, demapper 703, and equalizer delay buffer 704. The equalized and noise-whitened received signal at the input to Trellis decoder 406 consists of a series of expanded noisy vectors ($v_i$), where the constellation signal point transmitted by remote transmitter 101 is a point somewhere along that expanded vector. The operation of the remote precoder and local noise whitening filter results in an expanded signal constellation that maintains the valid Trellis state.

Trellis metric logic 701 computes an error metric representing the error between the received vector $v_i$ and possible Trellis states. (Although multiple error metrics may be used, for ease of explanation, the metrics associated with a particular state will be referred to as an error metric. The metric may also be referred to as a Trellis metric). Trellis metric logic 701 feeds the error metric $e_i$ and pointers to the respective previous states to the Viterbi traceback buffer 702. The Viterbi traceback buffer 702 uses the error metric $e_i$ and the pointers to trace back through a state machine and determine the Trellis state $T_i$ corresponding to that vector $v_i$. Viterbi traceback buffer 702 accumulates V states before the first Trellis state $T_i$ can be output to demapper 703. This number V is known as the depth of the Viterbi traceback buffer.

Note that the vector input to demapper 703 is not $v_i$, because $v_i$ corresponds to states entering, not exiting, the Viterbi traceback buffer 702. Instead, equalizer delay buffer 704 is used to delay the expanded noisy vectors $v_i$ (by Viterbi depth V) as states accumulate in Viterbi traceback buffer 702. Then, as states exit the Viterbi traceback buffer 702, equalizer delay buffer 704 provides to demapper 703 the vectors $v_i$ corresponding to those accumulated states. The expanded noisy vectors $v_i$ are scaled by $F/S_b'$ to a uniform grid for slicing in the demapper 703. For some implementations the equalizer delay buffer 704 may store vectors $v_i$ that have been previously scaled by $F/S_b'$ to reduce complexity.

Once a Trellis state $T_i$ is output from Viterbi traceback buffer 702, demapper 703 uses Trellis state $T_i$ to slice the vector $v_i'$, producing the noise-free expanded ideal reference vector $x_i$. Scalar 605 scales the output of demapper 703 by factor $S_b'$ to the original power of the expanded vectors $v_i$. The ideal reference vector $x_i$ will represent a constellation that has been expanded by the operation of the precoder and noise-whitening filter.

Precoder reconstruction unit 408 operates on expanded ideal reference vector $x_i$ to reconstruct the bounded constellation vector which was originally produced by the remote transmitter 101. This reconstructed ideal reference vector is then sliced by decoder 410 to recover the data bits originally produced by the remote transmitter 101.

In a conventional Trellis decoder, the output of equalizer delay buffer 704 is delayed by a fixed number of symbol times D, equal to the depth of the Viterbi traceback buffer (V). In the embodiment of FIG. 7, D is variable, and its value is determined by controller 705. Controller 705 sets D=V at the start of a frame, and when the terminating pad 204 is received, controller 705 begins the truncation process by reducing D to zero. (This process will be explained in more detail in connection with FIGS. 8 and 9.) On receipt of the reduced-density terminating pad, controller 705 also changes the values of $S_b$ and $F/S_b$ used by DFE block 404 for scaling. After delay D, these same values are output as $S_b'$ and $(F/S_b)'$ by delayed control block 706. The delayed values are used by demapper 703 and precoder reconstruction unit 408 for scaling.

Figure 8:
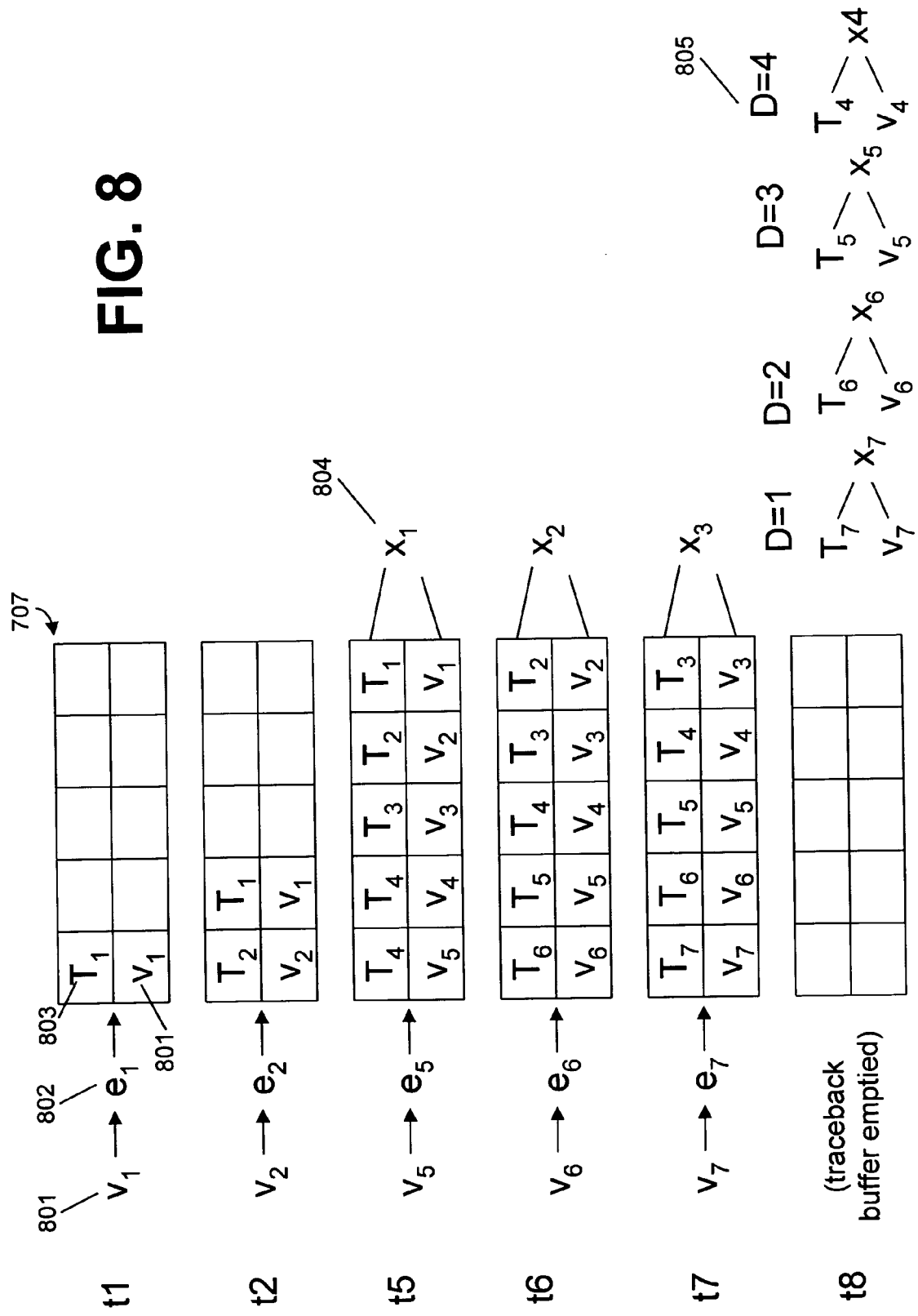
FIG. 8 is a trace buffer diagram of the receiver used by the communications system of FIG. 1.

FIG. 8 is a diagram showing more details of truncated Trellis decoding performed by exemplary embodiments of the Trellis decoder 406 and Truncated Trellis decoding logic 407. The contents of Viterbi traceback buffer 702 and equalizer delay buffer 704 are shown at various points in time. In this example embodiment, Viterbi traceback buffer 702 has depth V=5, delay D is initialized to V, and the number of symbols in the terminating pad is 2. At symbol time t1, incoming vector $v_1$ (801) enters Trellis metric logic 701, which produces error metric $e_1$ (802). The error metric $e_1$ is input to Viterbi traceback buffer 702, which computes a Trellis state $T_1$ (803) from the error metric. Trellis state $T_1$ is loaded in the newest position in Viterbi traceback buffer 702. At the same time, incoming vector $v_1$ enters equalizer delay buffer 704. Since D=V, equalizer delay buffer 704 produces no output yet.

At symbol time t2, incoming vector $v_2$ enters Trellis metric logic 701, and error metric $e_2$ is produced. Error metric $e_2$ is loaded into Viterbi traceback buffer 702 Trellis state $T_2$ is computed from the error metric. Trellis state $T_2$ is loaded in the newest position in Viterbi traceback buffer 702, with Trellis state $T_1$ shifting to the next position. At the same time, incoming vector $v_2$ enters equalizer delay buffer 704 and vector $v_2$ is shifted one position. Equalizer delay buffer 704 produces no output.

Processing for symbol times t3 and t4 are analogous, and are not shown. As one skilled in the art understands, trellis state T is actually a set of pointers from all current trellis states to the respective preceding Trellis states.

At symbol time t5, incoming vector $v_5$ enters Trellis metric logic 701, and error metric $e_5$ and Trellis state $T_5$ are produced. At this point, there are states corresponding to 5 symbols in Viterbi traceback buffer 702, equal to the depth V of Viterbi traceback buffer 702. Viterbi traceback buffer 702 has enough state information to begin the traceback through the state machine and produce an output symbol. Thus, Viterbi traceback buffer 702 traces back through the preceding trellis state pointers, starting with state $T_5$ associated with incoming vector $v_{5g}$ to recover the oldest Trellis state $T_1$. This oldest Trellis state $T_1$ is used by demapper 703 to slice vector $v_1$ from equalizer delay buffer 704 and produce ideal reference vector $x_1$ (804) as output. (Decoding will be finished by decoding 407 after precoder reconstruction unit 408.)

At symbol time t6, incoming vector $v_6$, corresponding to the first symbol in terminating pad 204, enters Trellis metric logic 701. (First pad symbol is determined by receiving an end-of-data marker, as described in connection with FIG. 2). Because the terminating pad 204 was transmitted with a lower constellation density, error metric $e_6$ is error-free, and consequently, Trellis state $T_6$ is very reliable. Viterbi traceback buffer 702 traces back starting with state $T_6$, to recover oldest Trellis state $T_2$. Viterbi traceback buffer 702 uses Trellis state $T_2$ in combination with vector $v_2$ from equalizer delay buffer 704 to produce ideal reference vector $x_2$ as output.

At symbol time t7, incoming vector $v_7$, corresponding to the last symbol in terminating pad 204, enters Trellis metric logic 701. (As described in connection with FIG. 2, receipt of last pad symbol is determined by receipt of first pad symbol). Because the terminating pad 204 was transmitted with a lower constellation density, error metric $e_8$ is error-free, and consequently, Trellis state $T_8$ is very reliable. Viterbi traceback buffer 702 traces back starting with state $T_7$, to recover Trellis state $T_3$. Viterbi traceback buffer 702 uses Trellis state $T_3$ in combination with vector $v_3$ from equalizer delay buffer 704 to produce ideal reference vector $x_3$ as output.

At symbol time t8, the last symbol in the terminating pad 204 has entered Viterbi traceback buffer 702, and the truncated decoding process begins. The presence of reliable Trellis states $T_7$ and $T_8$ in Viterbi traceback buffer 702 allows Viterbi traceback buffer 702 to output subsequent symbols without receiving incoming vectors or computing error metric(s) for those vectors. Therefore, the traceback of the Trellis decoder state machine can progress without waiting for new incoming vectors, using only information already stored in Viterbi traceback buffer 702 and in equalizer delay buffer 704.

Controller 705 first reduces D=5 to D=4 (805) to extract data within the Viterbi and equalizer delay buffers without introducing new incoming vectors. Equalizer delay buffer 704, using this reduced delay, produces vector $v_4$. Viterbi traceback buffer 702, using the reduced delay, uses the oldest Trellis state $T_4$ in combination with vector $v_4$ to produce ideal reference vector $x_4$ as output. Controller 705 then reduces D=4 to D=3, to recover then combine oldest Trellis state $T_5$ with vector $v_5$ to produce ideal reference vector $x_5$ as output. Ideal reference vectors $x_6$ and $x_7$ are output in a similar fashion.

Processing of symbols up to the time the last symbol of the terminating pad 204 enters Viterbi traceback buffer 702 occurs using symbol timing (because output depends on the next received symbol). Once the last terminating pad enters, processing is no longer tied to symbol timing. Rather, Trellis decoding is truncated and can proceed as fast as implementation allows.

FIG. 9 is a timing diagram showing how the various components of an exemplary embodiment interact to perform truncated trellis decoding. Equalizer output 901 is the received signal on output 403 (see FIG. 4) after clean-up and possible expansion by noise-whitening block 402. (It is this signal on output 403 which is input to Trellis decoder 406. The DFE is normally disabled during Trellis decoding.) Because this line depicts constellation density, it may consist of multiple lines: a single line in the middle means no symbols received; two lines means low-density symbols; four lines means high-density symbols. Delayed equalizer output 902 is the same signal but delayed by the depth of the Viterbi traceback buffer 702. Switch state 903 is a combined signal indicating the states of switch 305, switch 308, switch 502, and switch 504, which together determine whether precoding reconstruction is performed. The next line, b (904) is the number of bits per symbol. Switch state 905 is the state of switch 602 selecting input to the precoder reconstruction unit 408. The next line, $S_b'$ (906), is the value of scalar $S_b$, used at the input to Trellis decoder 406. The following line, $S_b'$ (907), is a delayed version of $S_b$, used at the output of Trellis decoder 406. Enable line (908) is a control signal that determines when the precoder reconstruction runs. The next line, D (909), is a signal that determines how long equalizer delay buffer 704 holds the received signal on output 403. The last line, RxData (910), is decoded data that is output by decoder 410.

Time t1 marks the receipt of the first symbol of header 202. This header symbol was transmitted with a relatively low constellation density. Several signal lines are affected by constellation density. Received data on equalizer output 901 transitions from zero (no symbols received) to two levels, and b (904) transitions from no bits-per-symbol to an intermediate number of bits-per-symbol. As described with reference to the transmitter in FIG. 3, scale factor $S_b$ is inversely proportional to the constellation density. Line $S_b$ (906), which corresponds to the value of scale factor $S_b$, therefore transitions from zero to a high level at t1.

The header symbol was transmitted without Trellis coding and without precoding, which affects several signal lines. Switch state 903 is low, indicating that switch 305, switch 308, switch 502, and switch 504 are set for uncoded operation. Switch state 905 transitions to high, indicating that switch 602 has selected the reference vectors ($x_i$) at the output of the uncoded slicer 405 to initialize the reconstruction FIR 601. Enable line (908) is high indicating precoder reconstruction is initializing. Switch state 903 remains low, indicating that noise-whitening block 402 and precoder reconstruction unit 408 are bypassed, and DFE block 404 is used instead.

Because the header symbol was also transmitted without Trellis coding, RxData (910) transitions on receipt of this symbol, showing the decoded header is available immediately.

Time t2 marks the receipt of the last symbol of header 202 and the first symbol of data 203. The data symbols were transmitted with a higher constellation density. Thus, received data on line equalizer output 901 transitions from two (low density) to four (high density) levels, and b (904) transitions from an intermediate bits-per-symbol to a high number of bits-per-symbol. Because the constellation density has changed, $S_b$ 906, which is inversely proportional to constellation density, transitions to a reduced (but non-zero) level at t2.

The data symbols were also transmitted with Trellis coding and with precoding. Thus, switch state 905 transitions back to low, indicating that switch 602 has selected the reference vectors ($x_i$) at the output of Trellis decoder 406 to fill the reconstruction FIR 601. Enable line (908) transitions to low indicating precoder reconstruction is not active but the initialized values are retained in the reconstruction FIR 601. RxData (910) transitions to zero on receipt of the last header symbol, because the data symbols following were transmitted with Trellis coding and will not be decoded until after a delay in the Viterbi traceback buffer 702.

Time t3 occurs after V symbols have entered Viterbi traceback buffer 702. With the traceback buffer full, Trellis decoder 406 now accepts an input vector from equalizer delay buffer 704. This is shown by delayed equalizer output 902 transitioning from zero to multilevel (high-density) symbols. Using this input vector and Trellis states already in the traceback buffer, Trellis decoder 406 runs through the state machine to produce an output symbol, the first one to exit Viterbi traceback buffer 702.

This first output symbol affects several signal lines. Now that the Trellis decoder 406 is outputting data, enable line (908) also transitions to run the precoder reconstruction unit 408. The first output symbol is a high-density data symbol rather than a low-density header symbol. Therefore, received data on RxData (910) transitions from zero to a high level, signifying the change in constellation density. Line $S_b'$ (907), which should match constellation density, also transitions at t3. This scale factor is used by both demapper 703 and precoder reconstruction unit 408.

Time t4 marks the first symbol of terminating pad 204 being received and also entering Viterbi traceback buffer 702. This symbol was transmitted with a low constellation density, and this change in density affects several signal lines. Received data on equalizer output 901 transitions from four levels to two. Line $S_b$ (906) (corresponding to an input to Trellis decoder 406) transitions from an intermediate to a high level (since the scaling is inversely proportional to density), and b (904) transitions from a high number of bits-per-symbol to an intermediate number.

Time t5 marks the last symbol of terminating pad 204 being received and also entering Viterbi traceback buffer 702. Since this pad marks the end of the current frame 201, the receiver sets up to receive the header of the next frame. This is indicated by switch state 903 transitioning back to low, bypassing noise-whitening block 402 and using DFE block 404 instead. As described with reference to FIGS. 7 and 8, once this last pad symbol enters Viterbi traceback buffer 702, the Trellis decoding process can be truncated. This is indicated by the downward step transitions in delay signal D (909). As D steps down, equalizer delay buffer 704 supplies the next vector and Viterbi traceback buffer 702 runs its state machine, without accepting new Trellis metrics, to produce the next reference vector vi.

Conventional Trellis decoding would not finish decoding until time t7. Conventional Trellis decoding requires decoding to be tied to an incoming symbol clock until the entire frame is decoded, since error metrics based on newly received data must be input to the Trellis decoder to produce each new output.

Using truncated Trellis decoding, the last symbol in terminating pad 204 is decoded at time t6, when delay signal D (909) goes to zero. With truncated Trellis decoding, symbols in terminating pad 204 are transmitted with excess margin, and this excess margin allows the Viterbi traceback buffer to be flushed once the last terminating pad symbol enters the traceback buffer, without computing new error metrics.

D. Trellis Symbol Interleaving

In yet another embodiment, multi-dimensional Trellis coding is combined with rate-adaptive symbol interleaving. Multi-dimensional Trellis coding transmits Trellis symbols in a series, where the Trellis decoder waits until all Trellis symbols in the series are received before decoding. This embodiment uses a 4D Trellis code, so the series known as a 4D symbol, consists of two symbols: an early Trellis 2D symbol and a late Trellis 2D symbol. Without interleaving, the first Trellis series produced is transmitted first, then the second, and then the third, producing the following sequence of Trellis symbols: E1, L1, E2, L2. When symbol interleaving is used, the early symbol and the late symbol of a particular series are not transmitted consecutively, but are interleaved with symbols from other series. The interleaver has a depth I indicating the number of symbol periods between early and late symbol pairs.

FIG. 10 illustrates the altered sequence produced by one embodiment of a transmitter with rate-adaptive symbol interleaving. The interleaver accepts words with a fixed number of bits for each 4D symbol and alters the sequence of these bits so they do not traverse the communications channel at the same time. Each input word contains four fields comprising fractional bits Ai and Bi plus phase bits Ei and Li, where i is the sequential order of the original input data words. Phase bits Ei select phase rotation of the early smbol. The phase bit Li is combined with a redundant Trellis bit to select the phase rotation of the late symbol.

In this example embodiment, the constellation encoder includes a fractional encoder followed by a subset encoder. However, fractional encoding is not required. Another embodiment uses a simpler constellation encoder which does not fractionally encode. In this example embodiment, the fractional bit resolution is ½ bit corresponding to a fractional frame size of two symbols. However, the system can be used for any combination of fractional frame size and number of Trellis code dimensions.

The first row marks successive symbol periods, starting with symbol 1. The next four rows show the bit fields input to the encoder. In this example embodiment, all bit fields arrive from the S/P buffer at the same symbol period. In another embodiment, bits are accepted by the encoder in the order of transmission.

Row 6 shows fractional outputs Ai and Bi from the encoder. These fractional outputs are subset-encoded constellations conveying a variable, rate-adaptive number of bits. Row 7 shows rotation outputs Ei and Li from the mapper. These rotation outputs are phase-encoded rotations of the subset constellations that convey the Trellis encoded bits. Both rows are in italics to indicate they are encoded/mapped to convey their respective data bit fields. Viewed together, rows 6 and 7 represent a single 2D Trellis symbol in a series (e.g., A1E1).

The eighth row shows Trellis symbols after decoding by the receiver. The receiver must await the late Li symbol before decoding a particular 4D combination. The ninth row shows the contents of the decoder FIFO used to retain late symbols for re-interleaving prior to precoder reconstruction. The tenth row shows Trellis symbols that have been re-interleaved, reconstructed and sliced by the receiver to produce samples in the original encoded sequence. (These symbols are not italicized because the final slicing operation recovers the original data bit fields.)

Row eleven shows the contents of a FIFO used to retain early bits until the corresponding late coded bit is reconstructed for final output. Row twelve shows the deinterleaving and modulus conversion of the reconstructed and sliced fractional bits. Row 13 shows the final data output merging all bit fields of the original encoded word when the late Trellis coded bit is finally reconstructed.

Interleaving starts at symbol time 1. Multiple input words are used to encode a burst of symbols (four in this example) during this first symbol time. However, not all are transmitted immediately. The constellation encoder produces fractional output A1, B1, A2 and B2. A2 , B1 and B2 are buffered in FIFO 1106 (see FIG. 11). A1 is combined with rotation output E1 produced by the mapper. The resulting 2D early symbol (A1E1) is transmitted during symbol time 1. Phase bits L1 are buffered in FIFO 1104 (see FIG. 11) for transmission on a late symbol.

No additional input bits are required by the constellation encoder at symbol time 2. Phase bits L2 are buffered. Phase bits E2 are input to the mapper to produce E2, which is combined with buffered B1 to produce another early symbol B1E2. This early symbol is transmitted during symbol time 2.

Processing during symbol time 3 is analogous to symbol time 2. No additional input bits are required by the constellation encoder. Phase bits L3 are buffered. Phase bits E3 are input to the mapper to produce E3, which is combined with buffered A2 to produce another early symbol A2E3. This early symbol is transmitted during symbol time 3. The final early symbol B2E4 is produced and transmitted during symbol time 4. The transmitted sequence thus far is: A1E1, B1E2, A2E3, B2E4.

At symbol time 5, the first buffered phase bits L1 leave the FIFO and enter the mapper. On previous symbol times, fractional output was combined with phase bits Ei to produce an encoded symbol. Now the fractional output A3 is combined in the mapper with phase bits L1 and the redundant Trellis bit to form symbol A3L1, the first late symbol. This late symbol is transmitted during symbol time 5. Note the two Trellis symbols in the first series (A1E1 and A3L1) are not transmitted sequentially, but are separated by I=3 Trellis symbols (equal to the FIFO depth in the transmitter).

The transmitted sequence thus far is A1E1, B1E2, A2E3, B2E4, A3L1. At symbol time 5, the Trellis decoder has the first complete Trellis series (A1E1 and A3L1), and can produce the first pair of corresponding reference vectors, A1E1 and A3L1.

The buffering allows the precoder reconstruction block to re-interleave and produce symbols in the original order used by the encoder in the transmitter. A1E1 is reconstructed and sliced. Since A1 and B1 are both needed together for fractional decoding, A1 is also buffered at the precoder reconstruction block until B1 is received. E1 is buffered in a FIFO awaiting L1. When B1 arrives at symbol time 7, A1 and B1 are fractionally decoded. The combined decoded bit field A1B1 is held in a FIFO until L1 arrives. When L1 arrives, all bit fields A1, B1, E1 and L1 are available to reconstruct the original encoded word in the correct order.

At symbol time 6, the fractional encoder in the transmitter has processed all its bits input during symbol time 1, so new input symbols are taken in. Symbol B3E5 is produced and transmitted, but the decoder in the receiver cannot decode another 4D Trellis symbol until another late symbol arrives at symbol time 7. No new input bits are need by the transmitter at symbol time 7, since symbol A4L2 has already been encoded is ready for transmission. New input bits are taken in at symbol time 8. Interleaving continues in this steady state (new input bits every other symbol period) until symbol period 16.

In this example scenario, symbol period 16 represents the end of input data frame 201, so no more interleaving takes place. The encoder finishes on symbol period 20 after sending the last 4 late symbols with no interleaving: A9L7, B9L8, A10L9 and B10L10. With no interleaving, these last 4 late symbols are decoded by the receiver immediately as they are received. At symbol time 20, the decoder finishes decoding the $10^{th}$ Trellis series (B10L10) with no interleaver delay. Also on symbol time 20, the final late symbols L7, L8, L9 and L10 are reconstructed in a burst at the end of the frame.

In this example scenario, a burst of noise hits symbols at times 8 and 9 (represented by showing these samples in bold). This noise impacts Trellis symbols E6 and L3. If the symbols were sequentially transmitted, the single Trellis encoded bit would not be able to protect/correct against the noise. However, because this embodiment uses Trellis symbol interleaving, this same burst is separated by 3 symbol periods in the Trellis decoder. Symbol E3 sent at time 3 will have lower noise, which will reduce the combined 4D metric of symbol E3L3 because only L3 is impacted by the burst. Subsequent symbols E4L4 and E5L5 will also have lower noise allowing accumulated path metrics to bleed off the burst noise of L3 before E6 is decoded. Symbol L6 sent at time 15 will also have lower noise, reducing the combined 4D metric of E6L6.

Figure 11:
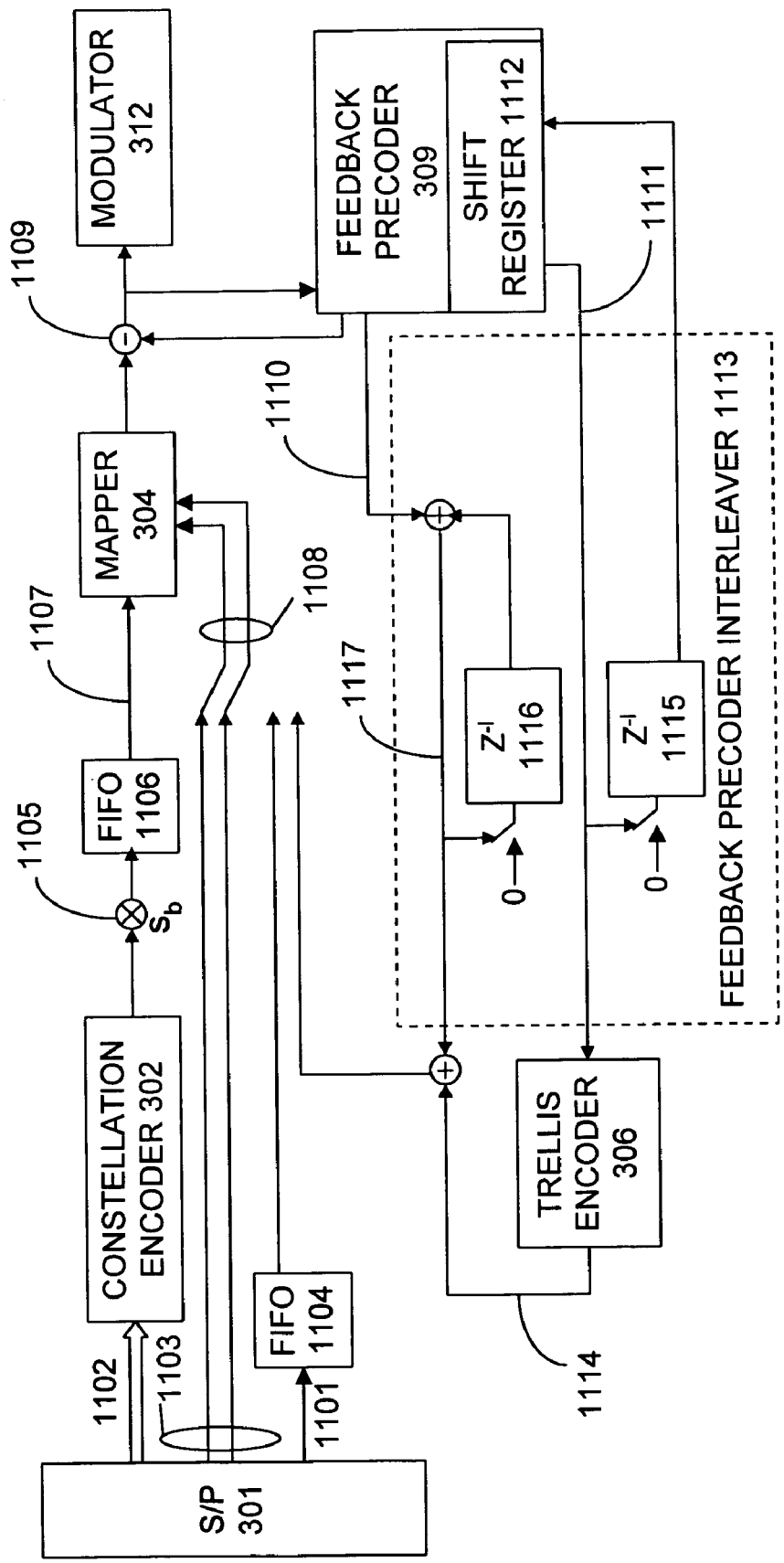
FIG. 11 is a block diagram of a transmitter with multi-dimensional Trellis coding and rate-adaptive symbol interleaving.

FIG. 11 is a block diagram of a transmitter with multi-dimensional Trellis coding and rate-adaptive symbol interleaving. The rate adaptive interleaver buffers all fractionally encoded data and the late trellis encoded phase bit. The fractional bits change with data rate and control the constellation density. The phase encoded trellis state is independent of data rate. The rate change will occur synchronously at the input buffer and remain constant through the precoder and receiver equalizer. The FIFO buffer delays the rate change at the precoder. The rate scaling can-be implemented at the FIFO input or output.

Transmit data (TXD) is collected in buffer 301 to facilitate extraction of data at a variable data rate. In this embodiment, the bits output from buffer 301 are divided into three groups (1101, 1102, and 1103). The bit in group 1101 (Li) is buffered by FIFO 1104. The bits in group 1102 (Ai and Bi) are provided as input to constellation encoder 302. The bit in group 1103 (Ei) is neither buffered nor constellation-encoded.

Constellation encoder 302 encodes a variable number of bits b of data per symbol using a constellation with density D. The constellation encoder may include a fractional encoder, such as a modulus converter, to encode a fractional number of bits to a constellation size D that is not a power of 2. In this embodiment, the constellation-encoded bits produced by constellation encoder 302 are scaled by scalar 1105 and then buffered in FIFO 1106. (Alternatively, the scaling can occur at the FIFO output rather than input). The number of constellation-encoded bits (b) will change when constellation density changes. The buffering in FIFO 1106 delays the changes in constellation density that appear at the precoder 309.

When output by FIFO 1106, the constellation-encoded subsets provide a first input (1107) to mapper 304. This first input is used by mapper 304 as a constellation subset. Mapper 304 also has a second input (1108) which bypasses the constellation encoder 302 and which is used to choose a signal point within the full constellation by rotating the constellation subset. It is this signal point which is modulated and transmitted. In this example embodiment, the mapping is rotationally invariant to avoid phase ambiguity in the channel. However, other mappings such as Gray coding can be used.

The second mapper input 1108 (the point selector) alternates on early and late Trellis symbols. On early Trellis symbols, mapper input 1108 comes from group 1103. These bits come from buffer 301 to select the early phase rotation of the mapper. The feedback precoder operates on the phase encoded signal and updates the Trellis state. On late Trellis symbols, one of the bits of mapper input 1108 comes from Trellis encoder 306, and the other from FIFO 1104. Thus, one of the bits in the late Trellis symbol is a Trellis-coded redundant bit. The early and late Trellis state, which is independent of constellation density, is buffered by precoder 309.

After mapping, precoding is applied as follows. Subtractor 1109 is applied to the output of mapper 304, so that the precoder feedback output of precoder 309 is subtracted from the mapper output to produce precoded signal x. The output of subtractor 1109 is passed to modulator 312, where the signal is modulated by conventional means. After modulation, other conventional means (not shown) convert the modulated signal to an analog waveform, amplify the waveform and couple it to channel 103.

In addition to being supplied to modulator 312, the output of subtractor 1109 (precoded signal x) is also fed back into precoder 309. Precoder 309, which was described earlier in connection with FIG. 3, has two outputs: modulo count 1110, from the precoder modulo operator 317 (see FIG. 3); and sliced Trellis state 1111, from the precoder slicer 319. Sliced Trellis state 1111 is input into a shift register 1112. Shift register 1112 provides one input to the feedback precoder interleaver 1113, and modulo count 1110 provides another input.

Feedback precoder interleaver 1113 interleaves the modulo count 1110 and the sliced Trellis state 1111. Trellis encoder 306 uses the interleaved sliced Trellis state and the interleaved modulo count to compute the next state of the encoder, producing a Trellis-encoded bit 1114. It is this Trellis-encoded bit 1114 which is used in the late Trellis symbol.

Inside feedback precoder interleaver 1113, the sliced Trellis state 1111 input is passed on to Trellis encoder 306, and is also supplied as input to delay buffer 1115. Delay buffer 1115 in turn feeds back into shift register 1112 to restore the respective early register state when computing the late trellis state of any 4D symbol. The modulo count 1110 is combined with the output of a second delay buffer 1116 to produce signal 1117. Signal 1117 is combined with the Trellis-encoded bit output by Trellis encoder 306. Signal 1117 also feeds back into delay buffer 1116.

For initialization and at the end of each late symbol the input switch to buffers 1115 and 1116 selects zero to initialize the next 4D symbol. During early symbols the buffers will store the early state for subsequent combination with the respective late symbol of each Trellis 4D symbol. The delay buffers ($Z^{-1}$) will store the early symbols until the corresponding late coded symbol is to be encoded. Referring to FIG. 10, the first symbol A1E1 is encoded. First, based on past history, the precoder and generates a precoder feedback signal and an early trellis state e1 that is stored in the buffers. Then symbol A1E1 is phase encoded and precoded by subtracting the precoder feedback. Likewise, states e2, e3, and e4 are stored on the next 3 symbol periods. Then, on symbol 5 the precoder generates a precoder feedback signal and the late trellis state l1 based on its past history. The late state l1 is combined with the early state e1 in the buffer 1115 for updating the trellis encoder.

The output of the trellis encoder is combined with the modulo count 1117 to produce the second phase bit which is combined with E1 exiting the FIFO 1104 and selected by switch 1108 to mapper 304 for phase encoding. The precoder feedback signal is subtracted from the phase-encoded signal to produce the final output symbol A3L1. In this way, the modulo count 1110 and sliced Trellis state 1111 are interleaved.

Figure 12:
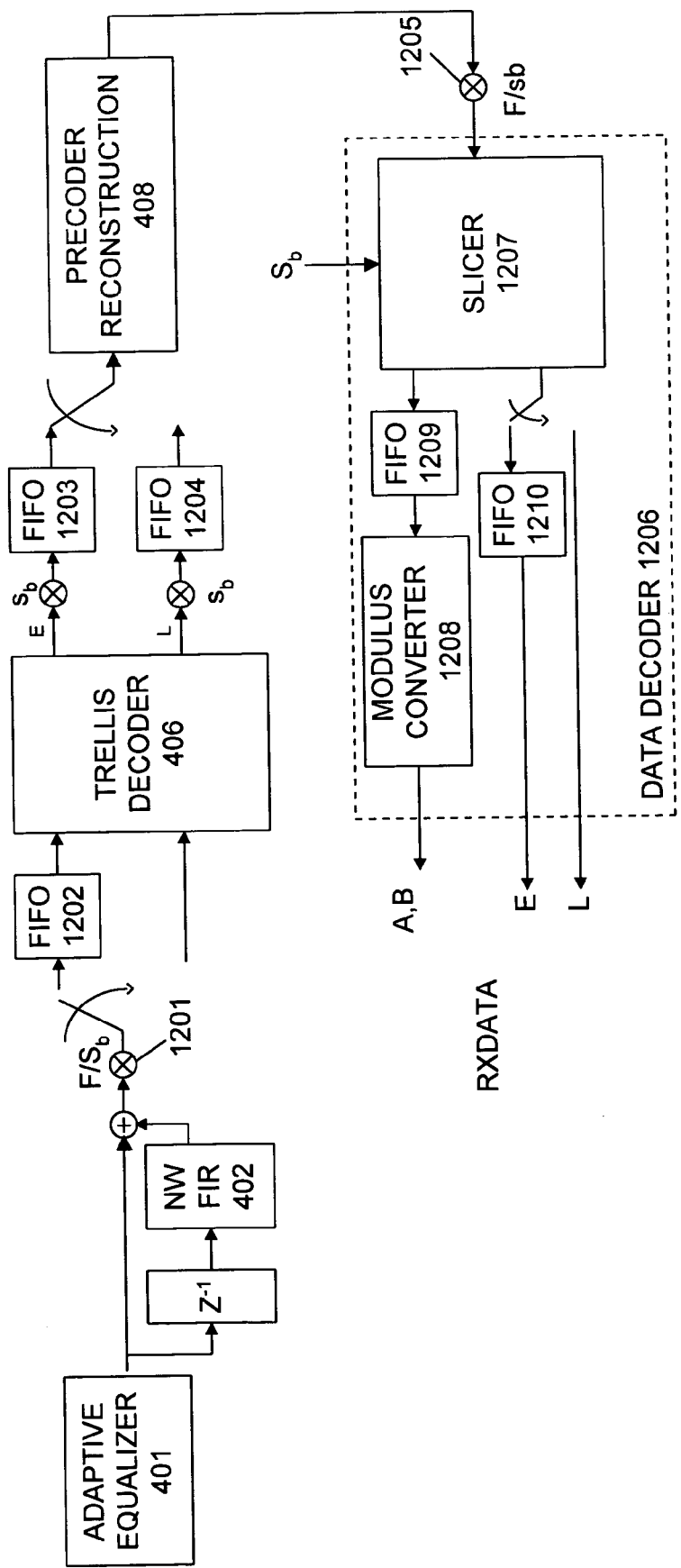
FIG. 12 is a block diagram of a receiver with multi-dimensional Trellis coding and rate-adaptive symbol interleaving.

FIG. 12 is a block diagram of a receiver with multi-dimensional Trellis coding and rate-adaptive symbol interleaving. The received signal is extracted by a conventional hybrid circuit, filtered, converted from analog to digital, and digitally filtered (not shown), then supplied as input to a conventional adaptive equalizer 401. The output of adaptive equalizer 401 is provided as input to noise-whitening block 402. The output of noise-whitening block 402 is combined with the output of adaptive equalizer 401, and the resulting signal is scaled by a factor $F/S_b$ (1201). This scaling provides a uniform grid for slicing and decoding.

Early Trellis symbols are buffered by FIFO 1202 for de-interleaving before feeding into Trellis decoder 406, while late symbols are fed into Trellis decoder 406 without delay. Trellis decoding occurs as late Trellis symbols arrive. As a result, the Trellis code is de-interleaved, but the constellation-encoded bits remain interleaved. Therefore, the pairs of early and late ideal reference vectors output by Trellis decoder 406 are buffered by FIFOs 1203 and 1204. (The buffered reference vectors are also density-scaled by factor $S_b$ at either the input or output to FIFOs 1203 and 1204).

The outputs of FIFOs 1203 and 1204 are used to re-interleave the early and late ideal reference vectors for precoder reconstruction in the order they were transmitted. The re-interleaved ideal reference vectors (now in the originally transmitted sequence) are reconstructed by precoder reconstruction unit 408. After reconstruction, the ideal reference vectors are re-scaled to a uniform grid (using factor $F/S_b$ 1205) for slicing by data decoder 1206

Data decoder 1206 includes slicer 1207, modulus converter 1208, and FIFOs 1209 and 1210. The sliced subset output of slicer 1207 is fed into FIFO 1209. The output of FIFO 1209 is decoded by modulus converter 1208 to produce data bit fields Ai and Bi. Ai is held in the FIFO 1209 until Bi arrives for conversion. For integer bit modulation the conversion is simply a shift operation to combine the two data bit fields. The phase bits output by slicer 1207 are independently buffered in FIFO 1210. All bits in FIFOs 1209 and 1210 await the arrival of the single late Trellis-encoded bit. As late symbols including the late Trellis-encoding bit arrive at the output of slicer 1207, data bit fields Ai and Bi and the phase bits Ei or Li from FIFO 1210 are merged with this Trellis-encoded bit to produce the final decoded data RXD.

Using the transmitter of FIG. 11 and the receiver of FIG. 12, adapting to a change in constellation density is accomplished as follow. Constellation encoded components are transmitted sequentially and are not aligned with their corresponding multi-dimensional Trellis symbols. Thus, modulus-converted Ai and Bi will be transmitted sequentially. The initial A1 and B1 are both transmitted on the early Trellis symbol of two different 4-D Trellis series, as shown in FIG. 10. At the receiver, the equalizer output is scaled to a uniform grid for slicing and decoding. The uniform grid ensures consistent error metric calculations, because error vectors are compressed on constellations with lower densities. The constellation density and corresponding scale factor can change on any fractional frame boundary.

In another embodiment, multiple Trellis coders are used to perform symbol interleaving. For example, a 4-coder system with adjacent symbols could be used to implement the symbol interleaving. In this examplary multiple-coder embodiment, early symbol L1 and late symbol E5 could be produced by the same coder. In one embodiment, the number of coders (N) is different than the symbol interleaver depth (n*N−1). In the following table the multiple coders are designated α, β, γ and δ. Capital letters (A, B, Γ, and Δ) identify the late symbol of the 4-D pair. A multiple coder system without symbol interleaving will have adjacent early and late pairs susceptible to a 2-symbol burst. For 4 coders and a 3-symbol interleaver, or 3 coders and a 2-symbol interleaver, each of the coders has symbols dispersed by at least 3 symbol periods.

| | Sample | | | | | | | | | | | | | | | | | | | | Distance |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | |
| 4 Coders | α | A | β | B | γ | Γ | δ | Δ | α | A | β | B | γ | Γ | δ | Δ | α | A | β | B | 1 &9 |
| No Symbol | 1 | 1 | 1 | 1 | 1 | 1 | 1 | 1 | 2 | 2 | 2 | 2 | 2 | 2 | 2 | 2 | 3 | 3 | 3 | 3 | 0 |
| 4 Coders | α | β | γ | A | δ | B | α | Γ | β | Δ | γ | A | δ | B | α | Γ | β | Δ | A | B | 3 &5 |
| 3 Symbols | 1 | 1 | 1 | 1 | 1 | 1 | 2 | 1 | 2 | 1 | 2 | 2 | 2 | 2 | 3 | 2 | 3 | 2 | 3 | 3 | 1 |
| 4 Coders | α | β | A | γ | B | δ | Γ | α | Δ | β | A | γ | B | δ | Γ | α | Δ | β | A | B | 3 &5 |
| 2 Symbols | 1 | 1 | 1 | 1 | 1 | 1 | 1 | 2 | 1 | 2 | 2 | 2 | 2 | 2 | 2 | 3 | 2 | 3 | 3 | 3 | 0 |
| 3 Coders | α | β | A | γ | B | α | Γ | β | A | γ | B | α | Γ | β | A | γ | B | α | Γ | A | 3 |
| 2 Symbols | 1 | 1 | 1 | 1 | 1 | 2 | 1 | 2 | 2 | 2 | 2 | 3 | 2 | 3 | 3 | 3 | 3 | 4 | 3 | 4 | 0 |
| 2 Coders | α | β | A | B | α | β | A | B | α | β | A | B | α | β | A | B | α | A | | | 2 |
| 2 Symbols | 1 | 1 | 1 | 1 | 2 | 2 | 2 | 2 | 3 | 3 | 3 | 3 | 4 | 4 | 4 | 4 | 5 | 5 | | | 0 |
| 2 Coders | α | β | α | β | A | B | A | B | α | β | α | β | A | B | A | B | α | A | | | 2 |
| 3 Symbols | 1 | 1 | 2 | 2 | 1 | 1 | 2 | 2 | 3 | 3 | 4 | 4 | 3 | 3 | 4 | 4 | 5 | 5 | | | 1 |
| ... | | | | | | | | | | | | | | | | | | | | | |
| ... | | | | | | | | | | | | | | | | | | | | | |
| 1 Coder | e | e | L | e | L | e | L | e | L | e | L | e | L | e | L | e | L | e | L | L | 0 |
| 2 Symbol | 1 | 2 | 1 | 3 | 2 | 4 | 3 | 5 | 4 | 6 | 5 | 7 | 6 | 8 | 7 | 9 | 8 | 10 | 9 | 10 | 1 |

The various embodiments described above can be implemented in software, hardware, or a combination of the two. In one embodiment, the elements may be implemented in software that is stored in a memory and that configures and is executed by a suitable digital signal processor (DSP) situated in a communication device. However, this software can be stored on any computer-readable medium, for transport or for use by or in connection with any suitable computer-related system or method. In the context of this document, a computer-readable medium is an electronic, magnetic, optical, or other physical device or means that can contain or store a computer program for use by or in connection with a computer-related system or method.

The above description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

The invention claimed is:

1. A method for receiving a first series of trellis-encoded symbols transmitted with a first constellation density and a second series of trellis-encoded symbols transmitted with a second constellation density less than the first, wherein a plurality of the second series of symbols comprises a terminating pad of a predetermined length, comprising:
   receiving and decoding the first series of trellis-encoded symbols in a trellis decoder;
   determining if one of the decoded symbols corresponds to an end-of-data marker identifying when the terminating pad will be transmitted;
   receiving the second series of trellis-encoded symbols comprising the terminating pad; and
   responsive to receiving a last symbol in the terminating pad, decoding all symbols remaining in a Viterbi traceback buffer by selecting a start state based on the last symbol, and repeatedly tracing back through a reduced number of symbols in the traceback buffer using the same selected start state on each trace cycle while reducing the number of symbols by one each trace cycle.

2. The method of claim 1, further comprising:
   decoding the symbols in the first series by filling the Viterbi traceback buffer;
   selecting a start state based on the last received symbol; and
   tracing back through the traceback buffer to flush from the buffer a decoded symbol.

3. The method of claim 1, wherein the pad has a fixed number of symbols.

4. The method of claim 1, further comprising:
   responsive to receiving an initial symbol of the terminating pad, changing a scale factor used to scale power on received symbols before the symbols are trellis-decoded, then restoring the scale factor before precoder reconstruction.

5. A method for adapting to a change in constellation density of received trellis-encoded symbols, comprising:
   receiving a trellis-encoded symbol transmitted with a first constellation density in a trellis decoder;
   determining if the trellis-encoded symbol corresponds to an end-of-data marker, the end-of-data marker identifying when the terminating pad will be transmitted at a second constellation density less than the first;
   receiving an initial symbol of the terminating pad;
   receiving a final pad symbol transmitted with the second constellation density; and
   responsive to receiving the final pad symbol, decoding all buffered symbols based on previously buffered trellis states without computing new error metrics, wherein the computed error metrics associated with the pad symbols produce reliable decoding.

6. The method of claim 5, further comprising:
   decoding a first previously buffered symbol based on a first computed trellis metric associated with the initial pad symbol and on at least one previously buffered trellis state, wherein the first metric is reliable as a result of the initial pad symbol being transmitted at the second constellation density.

7. The method of claim 6, wherein the step of decoding the first previously buffered symbol is responsive to receiving the initial pad symbol.

8. The method of claim 6, further comprising:
   decoding a second previously buffered symbol based on a second computed trellis metric associated with the final pad symbol and on at least one previously buffered trellis state, wherein the second metric is reliable as a result of the final pad symbol being transmitted at the second constellation density.

9. A method for receiving a first series of trellis symbols transmitted with a first constellation density and a second series of trellis symbols transmitted with a second constellation density less than the first, wherein a plurality of the second series of symbols comprises a terminating pad, comprising:
   receiving and decoding the first series of trellis symbols in a trellis decoder to determine receipt of an end-of-data marker, the end-of-data marker identifying when the terminating pad will be transmitted at a second constellation density less than the first;
   receiving a series of vectors, each vector corresponding to one symbol in the second series of trellis symbols; and
   responsive to determining that one of the vectors in the vector series corresponds to a final pad symbol:
      computing a trellis metric based on the vector, wherein the trellis metric is reliable as a result of the vector being at the second constellation density;
      loading a trellis state corresponding to the vector into a Viterbi traceback buffer;
      selecting a start state of the traceback buffer based on the trellis metric; and
      repeatedly tracing back through the traceback buffer, starting each trace cycle with the same selected start state while reducing the number of symbols by one each trace cycle, to flush all trellis states from the traceback buffer.

10. The method of claim 9 further comprising:
   responsive to determining that one of the vectors in the vector series corresponds to a first pad symbol,
      computing a trellis metric based on the vector, wherein the trellis metric is reliable as a result of the vector being at the second constellation density;
      loading a trellis state corresponding to the vector into a Viterbi traceback buffer;
      selecting a start state of the traceback buffer based on the trellis metric; and
      tracing back through the traceback buffer, starting with the selected start state, to flush one trellis state from the buffer.

11. A system, comprising:
means for receiving a first series of trellis-encoded symbols transmitted with a first constellation density;
means for decoding the first series of trellis-encoded symbols;
means for determining if one of the decoded symbols corresponds to an end-of-data marker identifying when a terminating pad of a predetermined length will be transmitted, where a plurality of a second series of trellis-encoded symbols comprises the terminating pad, the second series of trellis-encoded symbols transmitted with a second constellation density less than the first;
means for receiving the second series of trellis-encoded symbols comprising the terminating pad; and
means for decoding all symbols remaining in a Viterbi traceback buffer, responsive to receiving a last symbol in the terminating pad, by selecting a start state based on the last symbol, and repeatedly tracing back through a reduced number of symbols in the traceback buffer using the same selected start state on each trace cycle while reducing the number of symbols by one each trace cycle.

12. The system of claim 11, further comprising:
means for decoding the symbols in the first series by filling the Viterbi traceback buffer;
means for selecting a start state based on the last received symbol; and
means for tracing back through the traceback buffer to flush from the buffer a decoded symbol.

13. The system of claim 11, wherein the pad has a fixed number of symbols.

14. The system of claim 11, further comprising:
means for changing a scale factor used to scale power on received symbols before the symbols are trellis-decoded responsive to receiving an initial symbol of the terminating pad; and
means for restoring the scale factor before precoder reconstruction.

15. A system for adapting to a change in constellation density of received trellis-encoded symbols, comprising:
means for receiving a trellis-encoded symbol transmitted with a first constellation density;
means for determining if the trellis-encoded symbol corresponds to an end-of-data marker, the end-of-data marker identifying when the terminating pad will be transmitted at a second constellation density less than the first;
means for receiving an initial symbol of the terminating pad;
means for receiving a final pad symbol transmitted with the second constellation density; and
means for responsive to receiving the final pad symbol, decoding all buffered symbols based on previously buffered trellis states without computing new error metrics, wherein the computed error metrics associated with the pad symbols produce reliable decoding.

16. The system of claim 15, further comprising:
means for decoding a first previously buffered symbol based on a first computed trellis metric associated with the initial pad symbol and on at least one previously buffered trellis state, wherein the first metric is reliable as a result of the initial pad symbol being transmitted at the second constellation density.

17. The system of claim 16, wherein decoding the first previously buffered symbol is responsive to receiving the initial pad symbol.

18. The system of claim 16, further comprising:
means for decoding a second previously buffered symbol based on a second computed trellis metric associated with the final pad symbol and on at least one previously buffered trellis state, wherein the second metric is reliable as a result of the final pad symbol being transmitted at the second constellation density.

19. A system, comprising:
means for receiving a first series of trellis symbols transmitted with a first constellation density;
means for decoding the first series of trellis symbols to determine receipt of an end-of-data marker, the end-of-data marker identifying when the terminating pad will be transmitted at a second constellation density less than the first;
means for receiving a series of vectors, each vector corresponding to one symbol in a second series of trellis symbols transmitted with a second constellation density less than the first, wherein a plurality of the second series of symbols comprises a terminating pad; and
means for determining that one of the vectors in the vector series corresponds to a final pad symbol;
means for computing a trellis metric based on the vector responsive to determining that the vector corresponds to the final pad symbol, wherein the trellis metric is reliable as a result of the vector being at the second constellation density;
means for loading a trellis state corresponding to the vector into a Viterbi traceback buffer responsive to determining that the vector corresponds to the final pad symbol;
means for selecting a start state of the traceback buffer based on the trellis metric, responsive to determining that the vector corresponds to the final pad symbol, and
means for repeatedly tracing back through the traceback buffer, responsive to determining that the vector corresponds to the final pad symbol, starting each trace cycle with the same selected start state while reducing the number of symbols by one each trace cycle, to flush all trellis states from the traceback buffer.

20. The system of claim 19, further comprising:
means for determining that one of the vectors in the vector series corresponds to a first pad symbol;
means for computing a trellis metric based on the vector responsive to determining that the vector corresponds to the first pad symbol, wherein the trellis metric is reliable as a result of the vector being at the second constellation density;
means for loading a trellis state corresponding to the vector into a Viterbi traceback buffer responsive to determining that the vector corresponds to the first pad symbol;
means for selecting a start state of the traceback buffer based on the trellis metric responsive to determining that the vector corresponds to the first pad symbol; and
means for tracing back through the traceback buffer, responsive to determining that the vector corresponds to the first pad symbol, starting with the selected start state, to flush one trellis state from the buffer.

* * * * *

UNITED STATES PATENT AND TRADEMARK OFFICE
CERTIFICATE OF CORRECTION

Page 1 of 1

| | |
|---|---|
| PATENT NO. | : 7,522,679 B2 |
| APPLICATION NO. | : 10/956780 |
| DATED | : April 21, 2009 |
| INVENTOR(S) | : William L. Betts |

It is certified that error appears in the above-identified patent and that said Letters Patent is hereby corrected as shown below:

In FIG. 8, delete item number "707" and replace with --702--.

In FIG. 8, delete item "x4" and replace with --$x_4$--.

In column 7, lines 41-43: delete "the Viterbi traceback buffer 702."
and replace with --the Viterbi traceback buffer 702 (FIG. 7).--

In column 9, line 33: delete "Scalar 605 scales" and replace with
--A scalar scales--

In column 10, line 10: delete "Viterbi traceback buffer 702 Trellis state"
and replace with --Viterbi traceback buffer 702 and Trellis state--

In column 10, line 15: delete "vector $v_2$ is shifted" and replace with
--vector $v_1$ is shifted--

In column 10, line 30: delete "vector $v_{5g}$" and replace with --vector $v_5$--

In column 18, lines 16-18: delete "is accomplished as follow." and
replace with --is accomplished as follows.--

Signed and Sealed this
Nineteenth Day of July, 2011

David J. Kappos
*Director of the United States Patent and Trademark Office*